United States Patent
Benzies

(10) Patent No.: US 11,068,047 B2
(45) Date of Patent: Jul. 20, 2021

(54) VIRTUAL REALITY SYSTEM OBTAINING MOVEMENT COMMAND FROM REAL-WORLD PHYSICAL USER

(71) Applicant: VR-CHITECT LIMITED, Edinburgh (GB)

(72) Inventor: Leslie Peter Benzies, Los Angeles, CA (US)

(73) Assignee: VR-CHITECT LIMITED, Edinburgh (GB)

( * ) Notice: Subject to any disclaimer, the term of this patent is extended or adjusted under 35 U.S.C. 154(b) by 0 days.

(21) Appl. No.: 15/784,718

(22) Filed: Oct. 16, 2017

(65) Prior Publication Data

US 2018/0107269 A1  Apr. 19, 2018

Related U.S. Application Data

(60) Provisional application No. 62/410,107, filed on Oct. 19, 2016.

(30) Foreign Application Priority Data

Oct. 14, 2016  (GB) ..................... 1617446

(51) Int. Cl.
  *G06F 3/01*  (2006.01)
  *G06T 19/20*  (2011.01)
  (Continued)

(52) U.S. Cl.
  CPC .............. *G06F 3/012* (2013.01); *G06F 3/011* (2013.01); *G06F 3/0346* (2013.01);
  (Continued)

(58) Field of Classification Search
  CPC . G06F 3/01; G06F 3/011; G06F 3/012; G06F 3/0346; G06T 17/00; G06T 17/05; G06T 19/00; G06T 19/003; G06T 19/006
  (Continued)

(56) References Cited

U.S. PATENT DOCUMENTS 5,963,891 A * 10/1999 Walker ..................... G06F 3/011
                                                              345/959
6,144,385 A * 11/2000 Girard ..................... G06T 13/40
                                                              345/424

(Continued)

OTHER PUBLICATIONS

Fairs, Marcus. "Virtual Reality Architecture Will Be More Powerful Than Cocaine." Apr. 27, 2015, https://www.dezeen.com/2015/04/27/virtual-reality-architecture-more-powerful-cocaine-oculus-rift-tyhedfan-olivier-demangel-ivr-nation/.

(Continued)

*Primary Examiner* — Alexander Eisen
*Assistant Examiner* — Nelson Lam
(74) *Attorney, Agent, or Firm* — Womble Bond Dickinson (US) LLP

(57) ABSTRACT

A method comprises displaying in virtual reality a computer-generated scene; obtaining a movement command from a real-world physical movement of a user, the movement command corresponding to a movement of a virtual body; and adjusting the movement of the virtual body in dependence on an effect of gravity in the computer-generated scene and/or in dependence on the presence of at least one object within the computer-generated scene that inhibits the movement of the virtual body, wherein the adjusting of the movement is such that the adjusted movement of the virtual body does not correspond with the real-world physical movement of the user.

11 Claims, 14 Drawing Sheets

(51) Int. Cl.
 *G06T 15/50* (2011.01)
 *G06F 3/0346* (2013.01)
 *G06T 17/05* (2011.01)
 *G06T 19/00* (2011.01)
(52) U.S. Cl.
 CPC ............ *G06T 15/506* (2013.01); *G06T 17/05* (2013.01); *G06T 19/003* (2013.01); *G06T 19/20* (2013.01); *G06T 2215/16* (2013.01); *G06T 2219/2024* (2013.01)
(58) Field of Classification Search
 USPC .......................................................... 345/7–9
 See application file for complete search history.

(56) References Cited

U.S. PATENT DOCUMENTS

| | | | | |
|---|---|---|---|---|
| 7,883,415 | B2* | 2/2011 | Larsen ................ | A63F 13/5258 463/36 |
| 8,564,532 | B2* | 10/2013 | Richardson ......... | G06F 3/04815 345/156 |
| 2006/0119576 | A1* | 6/2006 | Richardson ............ | G06F 3/012 345/156 |
| 2006/0287025 | A1* | 12/2006 | French .................... | A63F 13/10 463/4 |
| 2010/0182340 | A1* | 7/2010 | Bachelder .............. | G09G 3/003 345/633 |
| 2011/0090149 | A1* | 4/2011 | Larsen ................ | A63F 13/5258 345/158 |
| 2013/0063477 | A1* | 3/2013 | Richardson ............. | G06F 3/012 345/619 |
| 2014/0104274 | A1* | 4/2014 | Hilliges .................. | G06F 3/011 345/424 |
| 2015/0235430 | A1* | 8/2015 | Schowengerdt ........ | G06F 3/011 345/633 |
| 2016/0093107 | A1* | 3/2016 | Yamamoto ............ | A63F 13/215 345/633 |
| 2016/0300387 | A1* | 10/2016 | Ziman ..................... | H04N 7/157 |
| 2017/0092223 | A1* | 3/2017 | Fain .......................... | G06T 7/70 |
| 2019/0220087 | A1* | 7/2019 | Ishii ...................... | A63F 13/525 |

OTHER PUBLICATIONS

"Virtual Reality Design Consultancy Launches to Revolutionise Architecture and Design Process." Building Construction Design, Sep. 15, 2016, http://www.buildingconstructiondesign.co.uk/news/virtual-reality-design-consultancy-launches-revolutionise-architecture-design-process/.

"Introduction to Best Practices." https://developer.oculus.com/design/latest/concepts/book-bp/. Accessed Sep. 10, 2018.

* cited by examiner

VIRTUAL REALITY SYSTEM OBTAINING MOVEMENT COMMAND FROM REAL-WORLD PHYSICAL USER

CROSS-REFERENCE TO RELATED APPLICATIONS

This application claims the benefit of UK Patent Application No. 1617446.8 filed Oct. 14, 2016 and U.S. Provisional Patent Application No. 62/410,107, filed Oct. 19, 2016, which are entirely incorporated herein by reference.

FIELD

The present invention relates to virtual reality, for example to a system and method for viewing architectural structures in virtual reality.

BACKGROUND

Virtual reality may refer to a method of displaying a computer-generated three-dimensional environment such that a user perceives that they are interacting with that environment, for example walking through the environment. In some known virtual reality systems, a user wears a virtual reality headset (which may be called a head-mounted display). The virtual reality headset presents images on screens in front of the user's eyes. The images may create an impression of an immersive three-dimensional environment.

The user may interact with the computer-generated environment by, for example, moving his or her head, hands, or other body parts; or providing input via a hand-held device such as a games controller, wand, keyboard, or mouse.

The computer-generated environment may be representative of a real environment. For example, the computer-generated environment may be representative of a real building, street or natural environment.

In some circumstances, virtual reality may be used for architectural visualisation. The computer-generated environment may be representative of a structure (for example a building) that has not yet been constructed, or a structure that is being modified. A user may view a computer-generated image of the structure as if positioned inside the structure, for example as if moving from room to room within the structure or looking around a room of the structure.

SUMMARY

In a first aspect of the invention, there is provided a method comprising displaying in virtual reality a computer-generated scene representative of a structure; receiving a user input representative of a variation of a time or weather parameter; and updating the computer-generated scene in dependence on the variation of the time or weather parameter, thereby enabling the user to vary on command an appearance of at least part of the structure in the computer-generated scene to represent a change in time and/or weather conditions.

The computer-generated scene may be updated to show a different time, or different weather, from that initially represented in the computer-generated scene. Using the method, a user may view how a structure, for example a building, may look at different times or in different weathers. The user may comment on features of the structure and/or make changes in the structure. For example, the user may be an architectural client. By seeing a virtual representation of the structure as if viewed at different times and/or in different weather conditions, the user may approve or disapprove features of the structure, or suggest changes to the structure.

The updating of the computer-generated scene may comprise live updating of the computer-generated scene while the computer-generated scene is viewed in virtual reality by the user.

The user may vary time or weather while viewing the computer-generated scene. The variation of time or weather may be made in combination with other changes. For example, the user may vary the time or weather while moving around the computer-generated scene. The user may vary the time or weather while also varying a viewing position from which the user is viewing the computer-generated scene.

The user input representative of the variation of the time or weather parameter may be provided by the user via a handheld input device. The handheld input device may comprise at least one of a games controller, a wand.

The user input representative of the variation in the time or weather parameter may be provided by operating a user input tool. The user input tool may comprise a button, and the user input may comprise holding down the button. The user input tool may comprise a slider, and the user input may comprise sliding the slider. The user input tool may comprise a pressure-sensitive device, and the user input may comprise pressing the pressure-sensitive device. The user input tool may be real or virtual.

The user input representative of the variation in the time or weather parameter may be provided via the handheld input device by holding down a button on the handheld input device.

The handheld input device may provide a simple input mechanism that may be easy for the user to control. The handheld input device may be easy to control even when the user is simultaneously performing other actions, for example walking around the computer-generated scene. For example, the user may not have to select or type numerals in order to input a time. The handheld input device may be familiar and/or intuitive to the user.

The variation in the time or weather parameter may comprise an increment in time. The method may further comprise determining the increment in time in dependence on a length of time for which a or the user input tool is operated. The method may comprise determining the increment in time in dependence on a length of time for which a or the button is held down by the user.

The user may change time by using a single button control. Control via a single button may be simple for the user.

The computer-generated scene may be updated to represent a changed time without representing intermediate times between an initial time and the changed time. Updating without representing intermediate times may be fast and may provide the user with the information they have requested without providing other times which may be irrelevant to the user.

The computer-generated scene may be updated to represent intermediate times between an initial time and the changed time. Representing intermediate times may give the user an impression of time progressing. Representing intermediate times may provide a change that appears to be continuous. Representing intermediate times may provide a presentation that resembles a time-lapse video showing changes over time (for example, the effect of a succession of different sun positions).

The variation of the time or weather parameter comprises a variation in at least one of a time of day, a time of year, a type of weather.

The user may view the structure as if viewed at different times of day, at different times of year, and/or in different types of weather.

The method may comprise determining a sun position in dependence on a time of day and on a geographical location. The displaying and/or updating of the computer-generated scene may comprise generating the scene using the determined sun position.

The determining of the sun position may be further in dependence on a or the time of year.

The appearance of the structure at different sun positions may be particularly important to the user. For example, the user may be an architectural client. The user may want to see how much light is available in a particular room of the structure at a particular time of day, for example to see whether the lighting is inadequate or whether the lighting is excessive (for example, causing glare).

The at least one weather parameter may be determined based on at least one of the time of day, the time of year.

The variation of the weather parameter may comprise a variation of at least one of an extent of cloud coverage, a type of precipitation, a rate of precipitation, an amount of fog, an amount of smog.

The computer-generated scene may be representative of an interior of the structure. The variation of the time or weather parameter may comprise a variation of a sun position and/or type of weather visible from the interior of the structure via at least one door or window.

The method may further comprise displaying with the computer-generated scene a time display. The method may further comprise displaying with the computer-generated scene a calendar display. The method may further comprise displaying with the computer-generated scene a map display. The method may further comprise displaying with the computer-generated scene a weather display.

A time or calendar display may indicate to the user a time of day or year that is currently represented in the computer-generated scene. A map display may indicate to the user a geographical location of the structure and/or of the user. The weather display may indicate to the user a type of weather that is currently represented in the computer-generated scene.

In a further aspect of the invention, which may be provided independently, there is provided an apparatus comprising at least one display screen, at least one user input device, and at least one processor configured to: display in virtual reality on the at least one display screen a computer-generated scene representative of a structure; receive from the at least one user input device a user input representative of a variation of a time or weather parameter; and update the computer-generated scene in dependence on the variation of the time or weather parameter, thereby enabling the user to vary on command an appearance of at least part of the structure in the computer-generated scene to represent a change in time and/or weather conditions.

In another aspect of the invention, which may be provided independently, there is provided a method comprising: receiving photographic data representative of a geographical area, wherein a second part of the geographical area is further from a structure of interest than a first part of the geographical area; processing the photographic data to obtain a three-dimensional representation of the first part of the geographical area and a two-dimensional representation of the second part of the geographical area; and displaying in virtual reality a computer-generated scene representative of the structure of interest, wherein the computer-generated scene comprises the three-dimensional representation of the first part of the geographical area and the two-dimensional representation of the second part of the geographical area.

The three-dimensional representation and two-dimensional representation may be obtained by processing the same photographic data.

The first part of the geographical area may comprise or be adjacent to the structure of interest.

By using photographic data, a realistic representation of the geographical area may be obtained. For example, the photographic data may comprise a plurality of realistic images.

The three-dimensional representation and two-dimensional representation may be obtained from the same photographic data or from closely matching photographic data, for example photographic data that is matched in time of day and/or camera settings. The three-dimensional representation and two-dimensional representation may be a close visual match to each other. Structures, for example buildings, in the three- and two-dimensional representations may have similar appearance in the computer-generated scene. For example, the three-dimensional and two-dimensional representations may have similar tone, lighting, resolution, hue, brightness, colour parameters, or other image qualities.

By using a two-dimensional representation of a part of the geographical area that is further from the structure of interest, in some circumstances better performance may be achieved than may be obtained if a three-dimensional representation of the whole of the geographic region were to be used. For example, an amount of processing power used may be reduced and/or a speed of image generation may be increased.

By using a combination of a three-dimensional representation for a part of the geographical area that is nearer to the structure of interest, a better representation of structures near to the structure of interest may be obtained than if a two-dimensional representation were to be used. For example, a position of nearby structures may be represented in an accurate manner.

The photographic data may comprise at least one of aerial data, drone data.

Aerial data (which may for example be drone data) may be used to create a representative view outside the structure of interest, for example a representative view outside a building. The use of drone data may allow up-to-date photographic data to be acquired at a moderate cost. For example, if the structure of interest is a building that has not yet been built or that is to be modified, photographic data of a geographical area around a site or proposed site of the building may be obtained specifically for the purpose of displaying the building in virtual reality. Alternatively aerial data may be used that has previously been acquired for another purpose, for example data that has been acquired for mapping, planning or surveying.

The two-dimensional representation of the second part of the geographical area may comprise at least one static two-dimensional image of the second part of the geographical area.

The computer-generated scene may be displayed as if viewed from a viewpoint within or near the structure of interest. The or each static two-dimensional image may be a two-dimensional image of at least part of the second part of the geographical area as viewed from a viewing position within or near the structure of interest, which may or may not be the same viewing position from which the computer-generated scene is displayed. In some circumstances, displaying the computer-generated scene from a different viewing position than the viewing position from which the static two-dimensional image or images are viewed may not cause significant inaccuracy in the view presented. The second part of the geographical area may be considered to include structures that are in the far distance. A small difference in viewing position may not make much difference to the positions of structures in the far distance as viewed from the structure of interest.

The two-dimensional representation of the second part of the geographical area may comprise a single panoramic image.

The single panoramic image may be easily stored and/or easily used. The single panoramic image may provide a convenient representation of structures further from the structure of interest, for example structures in the far distance. The single panoramic image may provide a photographic backdrop.

The three-dimensional representation of the first part of the geographical area may comprise a plurality of three-dimensional objects, wherein each of the plurality of three-dimensional objects representative of a respective structure in the first part of the geographical area.

By representing structures in the first part of the geographical area as three-dimensional objects, the apparent position of the structures in the first part of the geographical area may be made to change in dependence on viewing position. A relative position of structures in the first part of the geographical area may change with viewing position.

Displaying in virtual reality the computer-generated scene may comprise displaying the computer-generated scene as if viewed from a first viewing position and subsequently displaying the computer-generated scene as if viewed from a second viewing position. An appearance of the two-dimensional representation may be substantially unchanged between the first viewing position and the second viewing position. An appearance of the three-dimensional representation may be different when viewed from the second viewing position than when viewed from the first viewing position.

Changing the position from which the computer-generated scene is viewed from the first viewing position to the second viewing position may change an apparent position of at least one structure in the three-dimensional representation relative to structures in the two-dimensional representation. Changing the position from which the computer-generated scene is viewed from the first viewing position to the second viewing position may not change an apparent position of a structure in the two-dimensional representation relative to other structures in the two-dimensional representation. Changing the position from which the computer-generated scene is viewed from the first viewing position to the second viewing position may change an apparent position of a structure in the three-dimensional representation relative to other structures in the three-dimensional representation. Effects of parallax may be simulated. Providing apparent relative movement may provide a more accurate representation of structures that are near to the structure of interest.

The method may further comprising determining the first part of the geographical area and the second part of the geographical area.

The first part and the second part of the geographical area may be pre-defined. The first part and the second part of the geographical area may be determined manually. The first part and the second part of the geographical area may be determined automatically.

The determining of the first part of the geographical area and the second part of the geographical area may be based on distance from the structure of interest. The determining of the first part of the geographical area may comprise determining a part of the geographical area that is within a threshold distance from the structure of interest. The determining of the second part of the geographical area may comprise determining a part of the geographical area is above a threshold distance from the structure of interest.

The threshold distance may be defined manually. The threshold distance may be defined automatically. The threshold distance may be variable by a user. The photographic data may be re-processed using a different threshold distance. An updated computer-generated scene may be obtained using the re-processed photographic data.

The determining of the first part of the geographical area and the second part of the geographical area may comprise dividing a set of structures in the geographical area between the first part of the geographical area and the second part of the geographical area.

The dividing of the set of structures may comprise respectively allocating each structure of the set of structures to the first part or to the second part of the geographical area based on at least one of: a distance of the structure from the structure of interest, a size of the structure, an importance of the structure.

The first part of the geographical area is generally closer to the structure of interest than the second part of the geographical area. However, in some circumstances, there may be an individual structure in the second part of the geographical area that is closer to the structure of interest than an individual structure in the first part of the geographical area. Structures may be allocated based on a distance from the structure of interest and on a size of the structure and/or an importance of the structure. For example, large and/or important structures at a given distance from the structure may be included in the three-dimensional representation when smaller and/or less important structures at that distance. Certain structures may be prioritised for three-dimensional representation, for example landmark structures.

The dividing of the set of structures in the geographical area between the first part of the geographical area and the second part of the geographical area may comprises allocating to the first part of the geographical area structures at a distance to the structure of interest that is below a threshold distance, and allocating to the second part of the geographical area structures at a distance to the structure of interest that is above the threshold distance.

The processing of the photographic data may comprise processing the photographic data using at least one of map data, planning data, distance data, laser data.

The processing of the photographic data to obtain the three-dimensional representation may comprise processing the photographic data using photogrammetry.

In a further aspect of the invention, which may be provided independently, there is provided an apparatus comprising at least one display screen, at least one user input device, and at least one processor configured to: receive photographic data representative of a geographical area, wherein a second part of the geographical area is further from a structure of interest than a first part of the geographical area; process the photographic data to obtain a three-dimensional representation of the first part of the geographical area and a two-dimensional representation of the second part of the geographical area; and display in virtual reality on the at least one display screen a computer-generated scene representative of the structure of interest, wherein the computer-generated scene comprises the three-dimensional representation of the first part of the geographical area and the two-dimensional representation of the second part of the geographical area.

In another aspect of the invention, which may be provided independently, there is provided a method comprising: displaying in virtual reality a computer-generated scene representative of a structure of interest, wherein the computer-generated scene comprises: a three-dimensional representation of a first part of a geographical area, and a two-dimensional representation of a second part of the geographical region, the second part of the geographical area being further from the structure of interest than the first part of the geographical area; wherein the three-dimensional representation of the first part of the geographical region and the two-dimensional representation of the second part of the geographical region are obtained from the same photographic data.

In a further aspect of the invention, which may be provided independently, there is provided an apparatus comprising at least one display screen, at least one user input device, and at least one processor configured to: display in virtual reality on the at least one display screen a computer-generated scene representative of a structure of interest, wherein the computer-generated scene comprises: a three-dimensional representation of a first part of a geographical area, and a two-dimensional representation of a second part of the geographical region, the second part of the geographical area being further from the structure of interest than the first part of the geographical area.

In another aspect of the invention, which may be provided independently, there is provided a method comprising: displaying in virtual reality an initial computer-generated scene comprising a miniature model of a structure at a first, smaller scale; receiving from the user a selection of a location in the miniature model, the location in the miniature model corresponding to a location in the structure; and displaying in virtual reality a further computer-generated scene representative of at least part of the structure at a second, larger scale, wherein the further computer-generated scene is displayed as if viewed from a viewing position in the structure that is selected in dependence on the selected location in the miniature model.

Displaying a representation of a miniature model may provide an easy and/or intuitive method for a user to navigate the structure. The user may directly interact with the miniature model. The user may select, for example a particular room within the structure. The location in the structure may be a viewing position that is of interest to the user. Selecting a location on the miniature model may be more straightforward than navigating to the selected location using another method, for example walking through the structure in virtual reality to reach the selected location.

The initial computer-generated scene may be representative of at least part of the structure. The miniature model may be displayed in the initial computer-generated scene as if the miniature model were present in the at least part of the structure.

The initial computer-generated scene may be representative of a different part of the structure than is represented in the further computer-generated scene. At least part of the further computer-generated scene may be the same as at least part of the initial computer-generated scene.

Displaying the miniature model in the at least part of the structure may allow the user to interact with the structure at two scales simultaneously. The user may have the impression of being inside a part of the structure, while also looking at a scale model of the entire structure which is provided by the miniature model.

The initial computer-generated scene may be displayed as if viewed from an initial viewing position. The initial computer-generated scene may comprise an indicator indicating a location on the miniature model that corresponds to the initial viewing position.

By indicating a location from which the user appears to be viewing the scene, the user may understand their viewing position in context. For example, the user may understand which room of the structure they are currently viewing.

The displaying of the further computer-generated scene may comprise displaying a or the representation of the miniature model at a or the smaller scale, wherein the representation of the miniature model is displayed in or adjacent to the further computer-generated scene.

Displaying the miniature model in both the initial scene and the further scene may allow the user to understand in context a position from which they are viewing the further scene.

The initial computer-generated scene may comprise an indicator indicating the selected location in the miniature model. The further computer-generated scene may comprise an indicator indicating the selected location in the miniature model.

The indicator may have a different visual appearance in the initial computer-generated scene than in the further computer-generated scene. For example, the indicator may have a first colour in the initial computer-generated scene (which is not viewed from a location corresponding to the selected location in the miniature model) than in the further computer-generated scene (which is viewed from a location corresponding to the selected location in the miniature model).

In some embodiments, one indicator appearance (for example, one colour) is used for a location corresponding to a current viewing position, and another indicator appearance (for example, another colour) is used for a selected location from which the scene is not being viewed.

The provision of indicators having different appearance may help the user to distinguish where they are in the structure from where they have requested to move to.

A transition from the initial computer-generated scene to the further computer-generated scene may comprise teleporting the user to the location in the further computer-generated scene that corresponds to the selected location in the miniature model. Teleportation may provide a quick and simple way of moving around the structure.

The user may provide the selection of the location in the miniature model by pointing an input device at the location in the miniature model. The input device may comprise at least one of a handheld input device, a games controller, a wand.

Pointing an input device at the miniature model may provide a quick and convenient way of selecting a location to move to.

An apparent position of the miniature model may be the same in the further computer-generated scene as in the initial computer-generated scene. The display of the miniature model may persist when a movement is made. The miniature model may be permanently displayed.

The miniature model may be at least partially transparent. The miniature model may be placed in a corner of a screen.

In a further aspect of the invention, which may be provided independently, there is provided an apparatus comprising at least one display screen, at least one user input device, and at least one processor configured to: display in virtual reality on the at least one display screen an initial computer-generated scene comprising a miniature model of a structure at a first, smaller scale; receive from a user via the at least one user input device a selection of a location in the miniature model, the location in the miniature model corresponding to a location in the structure; and display in virtual reality on the at least one display screen a further computer-generated scene representative of at least part of the structure at a second, larger scale, wherein the further computer-generated scene is displayed from a viewing position in the structure that is selected in dependence on the selected location in the miniature model.

In another aspect of the invention, which may be provided independently, there is provided a method comprising: displaying in virtual reality a computer-generated scene representative of a surface of interest and at least one further surface; receiving from a user an annotation input comprising a first part and a second part, wherein at least the second part extends beyond the surface of interest; and drawing the annotation in the computer-generated scene such that the first part is drawn on the surface of interest and the second part is drawn on an imaginary surface defined relative to the surface of interest.

The user may use an annotation that extends beyond one surface. By using an annotation that extends beyond one surface, the user may indicate an extension of the surface of interest, or to highlight the surface of interest by drawing around it. It may be recognised that the user wishes to continue to draw in a plane of the surface of interest rather than to jump to another surface. The annotation may be more versatile than an annotation that is restricted to a single surface. The method of providing the annotation may be intuitive to a user, who may expect an annotation that starts in one plane (the plane of the surface) to continue in that plane, rather than jumping to the plane of a different surface.

The annotation input may be provided by the user using a virtual annotation tool.

The virtual annotation tool may be operated using an input device, for example a handheld input device, controller, games controller, wand, mouse, or stylus. The annotation input may comprise an extended movement in space, for example a movement from left to right, right to left, up to down, or down to up. The annotation input may simulate drawing a line or shape, for example a geometrical shape.

The virtual annotation tool may comprise at least one of a virtual laser pointer, a virtual pencil, a virtual pen, a virtual spray can.

The virtual annotation tool may be configured to project a virtual substance from a first viewing position.

The virtual substance may comprise at least one of light, paint, ink. The virtual substance may be projected from the first viewing position so as to land on any surface in the line of sight of the virtual annotation tool.

The virtual annotation tool may provide a familiar effect, for example an effect similar to that of a laser pointer, which projects light onto the first object in its line of sight.

The method may further comprise selecting the surface of interest by projecting the virtual substance onto said surface of interest.

The computer-generated scene may comprise a plurality of surfaces. Before the user starts to provide the annotation input, the surface of interest may not have been identified. The surface of interest may be identified as the first surface that the user annotates using the virtual annotation tool. It may be assumed that the user wishes to continue in the plane of the first surface, for example to draw an extension to the first surface.

The method may further comprise determining a transition between the first part and the second part of the annotation. The transition between the first part and the second part may comprise a location at which the virtual substance ceases to be projected onto the surface of interest and starts to be projected onto a or the further surface.

If the annotation input jumps from one surface to another (for example, as the beam of a laser pointer may appear to jump when moving from one surface at a first distance from the laser pointer to another surface at a second distance from the laser pointer), the annotation input may be interpreted (and drawn) as if it had stayed in the plane of the first surface.

The determining of the transition may comprise determining the transition in dependence on a distance between the surface of interest and a further surface. The determining of the transition may be in dependence on a comparison between a threshold distance and the distance between the surface of interest and the further surface. If the distance between the surface of interest and the further surface is below the threshold distance, no transition may be determined. The annotation may be drawn on the surface of interest and on the further surface. If the distance between the surface of interest and the further surface is above the threshold distance, the part of the annotation in which the annotation tool projects onto the surface of interest may be drawn on the surface of interest, while the part of the annotation in which the annotation tool projects onto the further surface may be drawn on the imaginary surface defined relative to the surface of interest.

The defining of the imaginary surface may comprise defining the imaginary surface relative to a normal of the surface of interest. The normal may comprise a normal at an initial point of annotation on the surface of interest. The normal may comprise a normal at a final point of annotation on the surface of interest. The normal may be calculated as a vector perpendicular to a line connecting two previous annotation points.

The imaginary surface may be invisible in the computer-generated scene.

No representation of the plane may be rendered. The drawn annotation may appear to extend into free space.

The imaginary surface may comprise an imaginary plane. The imaginary plane may be aligned with at least part of the surface of interest.

The displaying of the computer-generated scene may comprise displaying the computer-generated scene as if viewed from the or a first viewing position.

The drawn annotation may appear to occupy the same position in three-dimensional space when viewed from the second viewing position as when viewed from the first viewing position.

The method may further comprise displaying the computer-generated scene and the drawn annotation from a second viewing position maintaining a position of the drawn annotation in the computer-generated scene, such that an appearance of the drawn annotation from the first viewing position is different from an appearance of the drawn annotation from the second viewing position.

The drawn annotation may maintain in the computer-generated scene a constant position relative to the surface of interest and the at least one further surface.

The method may further comprise displaying the computer-generated scene and the drawn annotation from a second viewing position such that the drawn annotation moves relative to the surface of interest and the at least one further surface. The drawn annotation may appear to occupy a different position in three-dimensional space when viewed from the second viewing position than when viewed from the first viewing position. The drawn annotation may rotate relative to the surface of interest and the at least one further surface to maintain a constant appearance relative to the viewer.

In a further aspect of the invention, which may be provided independently, there is provided an apparatus comprising at least one display screen, at least one user input device, and at least one processor configured to: display in virtual reality on the at least one display screen a computer-generated scene representative of a surface of interest and at least one further surface; receive from a user via the at least one user input device an annotation input comprising a first part and a second part, wherein at least the second part extends beyond the surface of interest; and draw the annotation in the computer-generated scene such that the first part is drawn on the surface of interest and the second part are drawn on an imaginary surface defined relative to the surface of interest.

In another aspect of the invention, which may be provided independently, there is provided a method comprising: displaying in virtual reality a computer-generated scene; obtaining a movement command from a real-world physical movement of a user, the movement command corresponding to a movement of a virtual body; and adjusting the movement of the virtual body in dependence on an effect of gravity in the computer-generated scene and/or in dependence on the presence of at least one object within the computer-generated scene that inhibits the movement of the virtual body, wherein the adjusting of the movement is such that the adjusted movement of the virtual body does not correspond with the real-world physical movement of the user.

Providing movement of a virtual body based on a user's real-world physical movement may provide an intuitive method of movement around the virtual scene. By including effects of gravity and/or interaction with objects in the scene, it may be possible to avoid making movements in the computer-generated scene that are not possible in the real-life environment represented in the scene. For example, a virtual head may not be able to float in mid-air, and a virtual body may not be able to walk through objects. Such constraints may provide increased realism in the scene.

A combination of a virtual head and virtual body may provide a movement that better simulates a physical movement than if only movement of virtual head were to be considered. For example, in some circumstances a virtual body or virtual body part may collide with an object in the scene, when the virtual head would not have collided with that object.

The virtual body may comprise at least one of a torso, an arm, a leg. The virtual body may represent at least part of a human form. The virtual body may be a simplified representation of at least part of a human form. The virtual body may comprise at least one geometrical shape. The virtual body may be one, two, or three-dimensional. The virtual body may be articulated.

If movement of only the virtual head (or a head and hands) were to be considered, it may be the case that a movement command would cause a virtual head and/or virtual body to become suspended in mid-air. For example, the user may request to step off a surface such as a table or balcony, and the system may allow them to do so. The virtual head and/or virtual body may be allowed to move to a viewing position which would not be possible in a real-life structure represented in the scene. By considering a virtual body, in some circumstances the user may not be allowed to perform some movements that would not be possible in the real-life structure.

A movement of a virtual head may be adjusted in dependence on the movement of the virtual body. Adjusting the movement of the virtual head in dependence on the movement of the virtual body may comprise at least one of reducing the movement of the virtual head, changing a trajectory of the virtual head, changing an angle of the virtual head.

The movement of the virtual body may comprise a movement from a first viewing position to a second viewing position.

The user may issue a movement command that requests the virtual head to move from a first viewing position to a second viewing position. In moving from the first viewing position to the second viewing position, the virtual body may be inhibited by an object in the computer-generated scene. Since the virtual body is coupled to the virtual head, the inhibition of the movement of the virtual body may reduce the movement of the virtual head. The resulting movement of the virtual head may terminate at or near the object that inhibited the movement of the virtual body.

By considering the movement of the virtual body, the user may be prevented from moving into a position that is impossible in real life by a representation of an object that would prevent them from doing so in real life, for example by interaction with a representation of a wall or balustrade in the computer-generated scene.

The virtual body may be deflected by the at least one object, causing a trajectory of the movement of the virtual head to change.

The first viewing position may be at a greater height in the scene than the second viewing position. The adjusting of the movement of the virtual head may comprise adjusting the movement of the virtual head to represent falling under gravity.

If the movement of the virtual body is affected by gravity, the movement of the virtual head may be adjusted to represent the action of gravity on the body. A position or orientation of the virtual head may be changed.

The first viewing position may be at an elevated part of the scene. For example the first viewing position may be representative of the user standing on a table or platform. The second viewing position may be at a less-elevated part of the scene. For example, the second viewing position may be representative of the user standing on the floor.

The adjusting of the movement of the virtual head may comprise adjusting the movement of the virtual head to represent a constraint on the virtual body due to the presence of the at least one object, the constraint preventing movement of the virtual head to the second viewing position.

The at least one object may comprise at least one of a wall, a balustrade, a rope, a barrier.

The movement of the virtual body may be in dependence on a movement of a virtual head. The movement of the virtual body may be in dependence on a movement of at least one virtual hand.

The real-world physical movement of the user may comprise a movement of the user's head.

The virtual head may be prevented from moving into a position that is impossible in real life. The virtual head may be prevented from moving by an object that interacts with the virtual body, but does not interact directly with the virtual head.

The user may walk in real life, and the user's walking may be translated into a movement command. The real-world movement may comprise a gesture. The real-world movement may comprise a movement of any appropriate part of the user's body, for example, a head, a torso, an arm, a leg, a hand or a foot.

The obtaining of the real-world physical movement may be via a user input device. The user input device may comprise at least one of a body suit, a tracking device, a camera, body recognition software.

The real-world movement may correspond to a movement that would not be possible in a structure that is represented in the computer-generated scene. For example, the real-world movement may correspond to stepping into thin air or walking through a wall. By adjusting the movement, a movement may be obtained that makes sense in the computer-generated scene. The movement may be adjusted to represent a movement that would be possible in the structure. For example, if the user attempts to move into mid-air, the user may fall. If the user attempts to cross a barrier such as the balustrade of a balcony, the user may be restrained. The user may be able to look over the balustrade, but may not be able to walk through the balustrade.

The movement command may comprise a teleport command from the first viewing position to the second viewing position.

In a further aspect of the invention, which may be provided independently, there is provided an apparatus comprising at least one display screen, at least one user input device and at least one processor configured to: display in virtual reality on the at least one display screen a computer-generated scene; obtain a movement command from a real-world physical movement of a user, the movement command corresponding to a movement of a virtual body; and adjust the movement of the virtual body in dependence on an effect of gravity in the computer-generated scene and/or in dependence on the presence of at least one object within the computer-generated scene that inhibits the movement of the virtual body, wherein the adjusting of the movement is such that the adjusted movement of the virtual body does not correspond with the real-world physical movement of the user.

In another aspect of the invention, which may be provided independently, there is provided a method comprising: displaying in virtual reality a computer-generated scene comprising an interactive virtual object, such that the interactive virtual object appears to be at a distance from a user; receiving from the user a remote selection of the interactive virtual object; in response to the remote selection, displaying a virtual manipulation indicator overlaid with or adjacent to the interactive virtual object, wherein the virtual manipulation indicator is indicative of the interactive virtual object being in an active mode in which the interactive virtual object can receive manipulation commands; receiving a manipulation command from the user; and in response to the manipulation command from the user, operating or moving the interactive virtual object, such that the interactive virtual object appears to be operated or moved at a distance from the user.

Allowing operation of an interactive virtual object at a distance may make it easier for a user to make changes in the appearance of the computer-generated scene. The user may not have to get near to the interactive virtual object in the computer-generated scene in order to operate it.

The interactive virtual object may be representative of a real control within the computer generated scene, and operating the interactive virtual object may allow the user to observe an effect of operating that real control.

The display of the virtual manipulation indicator may allow the user to understand which interactive virtual object is currently active. Therefore, the user may understand that any manipulation command will be directed to that active object.

The interactive virtual object may comprise at least one of a lighting control, a light switch, a door control, a door handle, a sound control, a window control, a window covering control, a heating control, an air conditioning control.

An interactive virtual object may represent any control within the computer-generated scene that in real life would be operable by a person. An interactive virtual object may represent a control that is only present in the computer-generated scene and would not be present in a real-life version of the structure represented in the computer-generated scene. An interactive virtual object may represent a moveable item, for example an item of furniture.

The virtual manipulation indicator may comprise a virtual hand.

The virtual hand may appear to be detached from the user. The virtual hand may appear not to be attached to a body. The virtual hand may appear to be floating in space. The virtual hand may be at least partially transparent. The operating or moving of the interactive virtual object may appear to be performed by a manipulation of the virtual hand.

The operating or moving of the interactive virtual object may appear to be performed by an action of the virtual manipulation indicator.

The display of an action of the virtual manipulation indicator may make it clear how the interactive virtual object is controlled. For example, the virtual manipulation indicator may appear to switch a switch, rotate a knob, or slide a slider. The display of an action of the virtual manipulation indicator may provide an intuitive display to the user. The display of an action of the virtual manipulation indicator may provide an display that is representative of a real-life control method.

The remote selection may be provided by the user by indicating the interactive virtual object using an input device.

The input device may comprise at least one of a handheld input device, a controller, a games controller, a wand.

The manipulation command may be provided by the user using the or an input device.

The manipulation command may be provided using the input device, for example by pressing a button on the input device. The manipulation command may be provided by a physical movement of the user, for example by a gesture.

An action of the virtual manipulation indicator may mimic an action of the input device. An action of the virtual manipulation indicator may mimic an action of the user.

The mimicking of the input device may cause the operation of the interactive virtual device to be intuitive to the user. A movement of the input device in space may cause a corresponding movement of the virtual manipulation device in virtual space. The input device may comprise, for example, a switch, button, knob or slider. The operation of the switch, button, knob or slider may be mimicked by the virtual manipulation indicator to control an interactive virtual object that is representative of a switch, button, knob or slider. For example, the virtual manipulation indicator may be a virtual hand, and the virtual hand may move as if controlling a switch, button, knob or slider.

The remote selection may be provided by the user by pointing at the interactive virtual object.

The pointing may comprise pointing the input device. The pointing may comprise pointing using a hand of the user.

An apparent distance between the user and the interactive virtual object may be greater than 1 metre, optionally greater than 5 metres, further optionally greater than 10 metres.

It may be more convenient for the user to be able to interact with the interactive virtual object at a distance (for example a distance of 10 metres or more) than to have to travel (for example, walk or teleport) to a position closer to the interactive virtual object.

The or a structure represented in the computer-generated scene may comprise at least one of an architectural structure, a building, a house, an apartment building, a residential building, a commercial building, an office building.

In a further aspect of the invention, which may be provided independently, there is provided an apparatus comprising at least one display screen and at least one processor, wherein the processor is configured to perform a method as described or claimed herein and to display in virtual reality the computer-generated scene on the at least one display screen.

In another aspect of the invention, which may be provided independently, there is provided a computer program product comprising computer readable instructions that are executable by a processor to perform a method as claimed or described herein.

There may be provided a method or system substantially as described herein with reference to the accompanying drawings.

Features in one aspect may be provided as features in any other aspect as appropriate. For example, features of a method may be provided as features of an apparatus and vice versa. Any feature or features in one aspect may be provided in combination with any suitable feature or features in any other aspect.

DETAILED DESCRIPTION OF EMBODIMENTS

Embodiments of the invention are now described, by way of non-limiting example, and are illustrated in the following figures, in which:—

Figure 15:
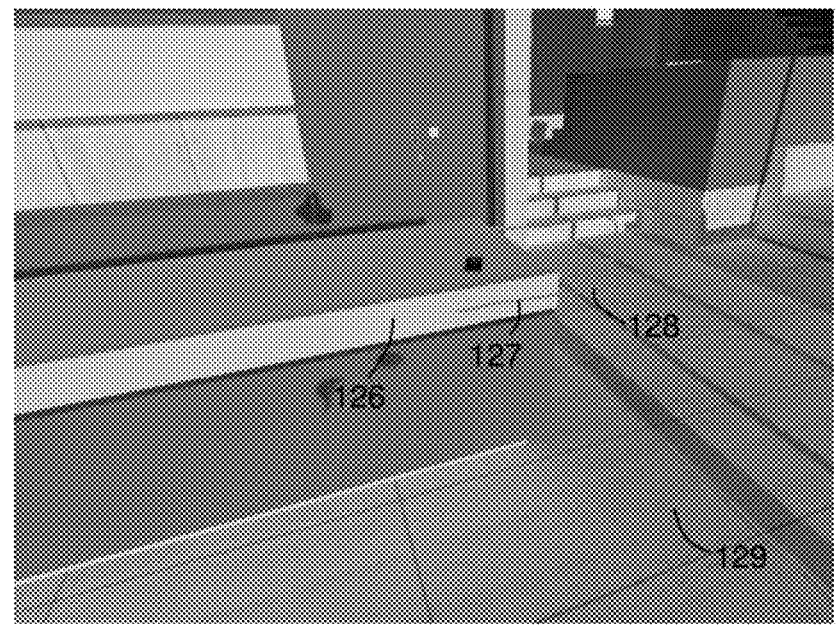
Figure 16:
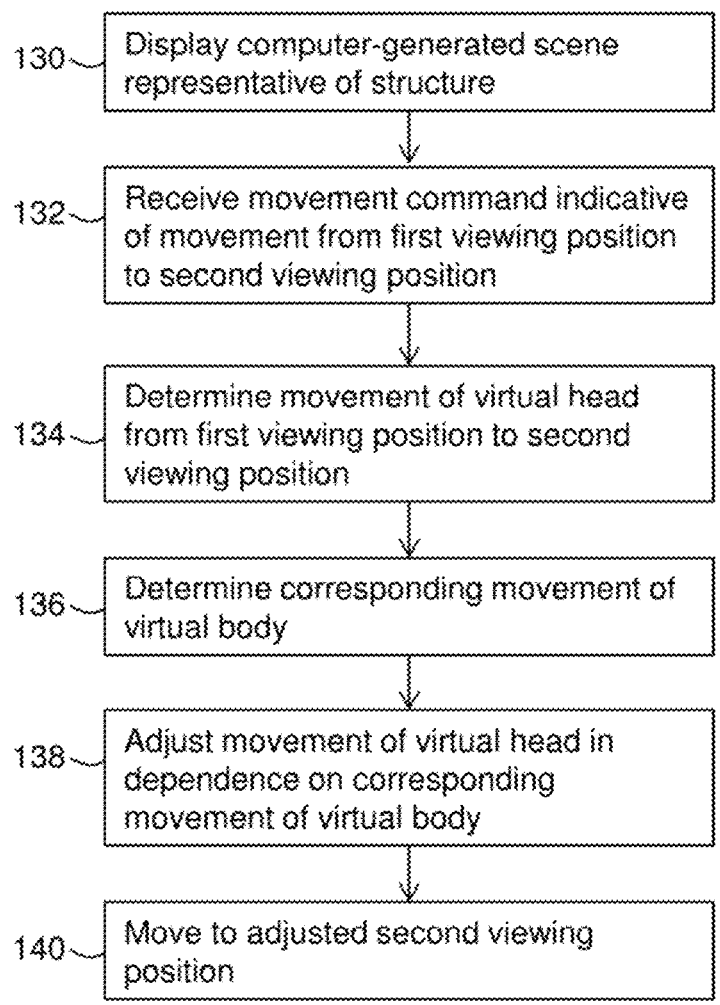
Figure 17:
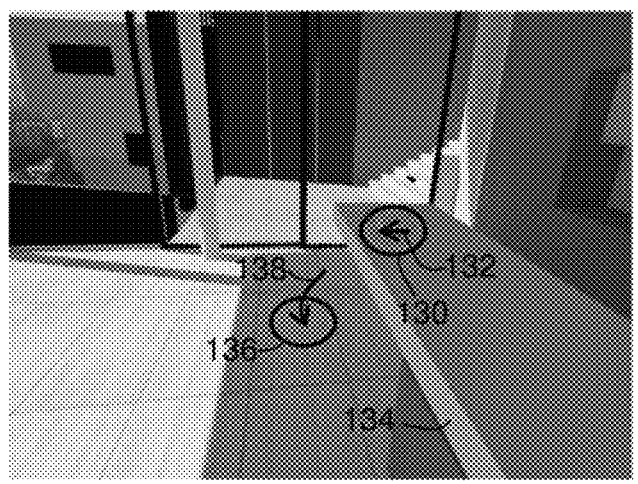
Figure 18:
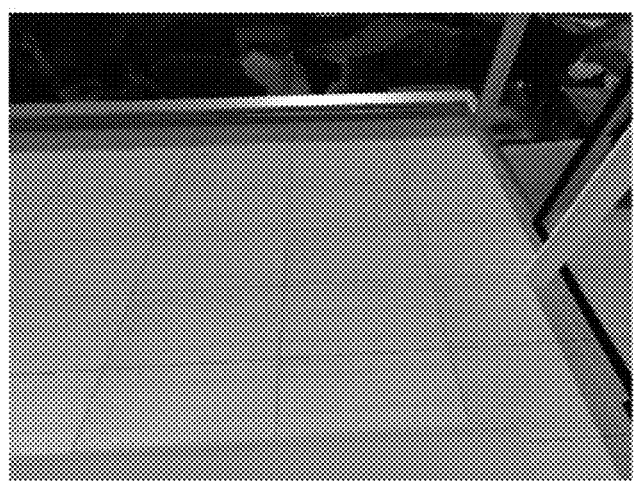
Figure 19:
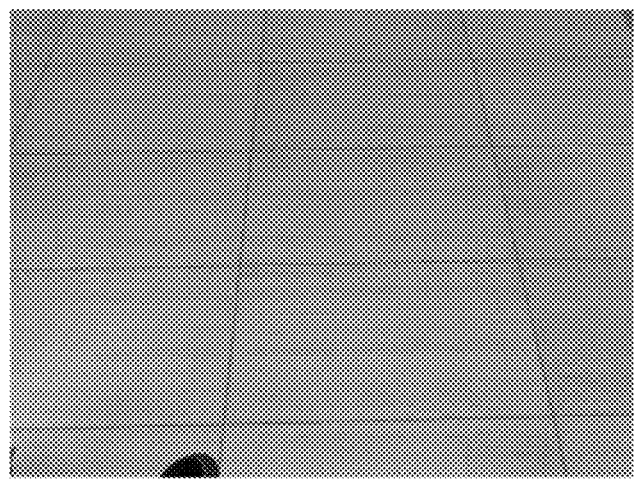
Figure 20:
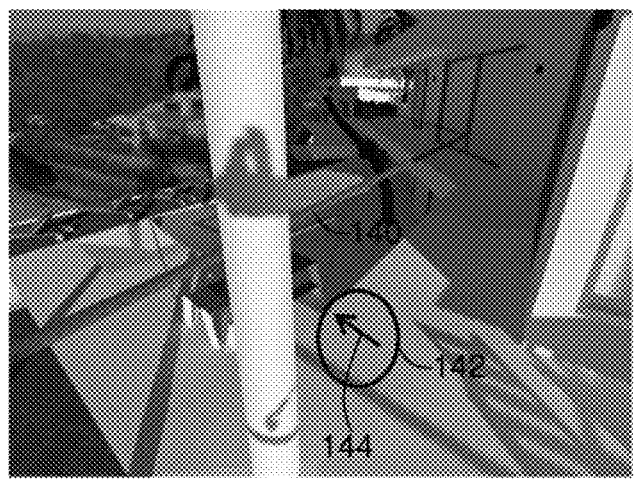
Figure 21:
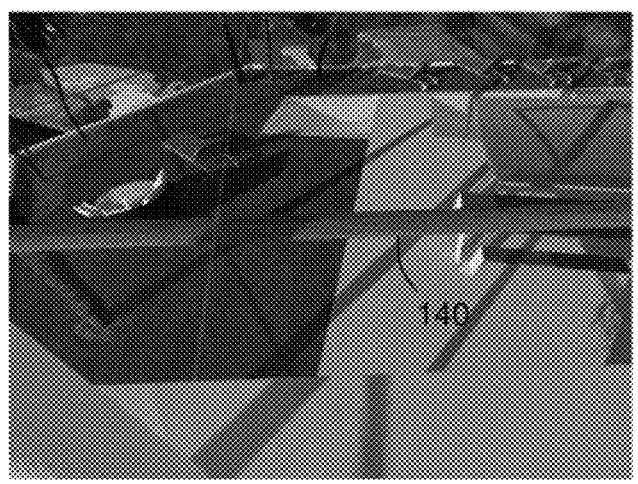
Figure 22:
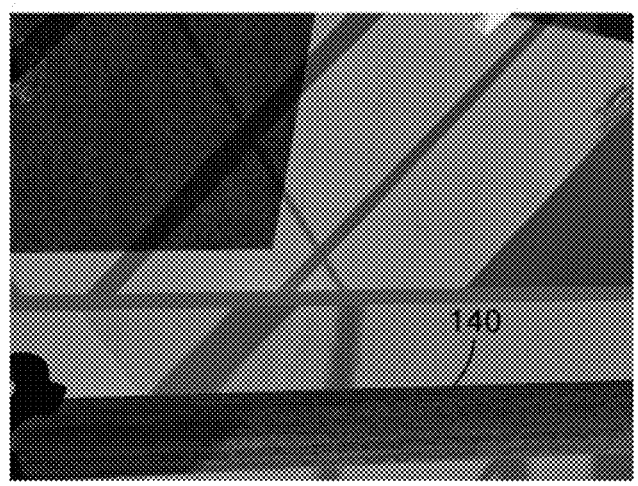
Figure 23:
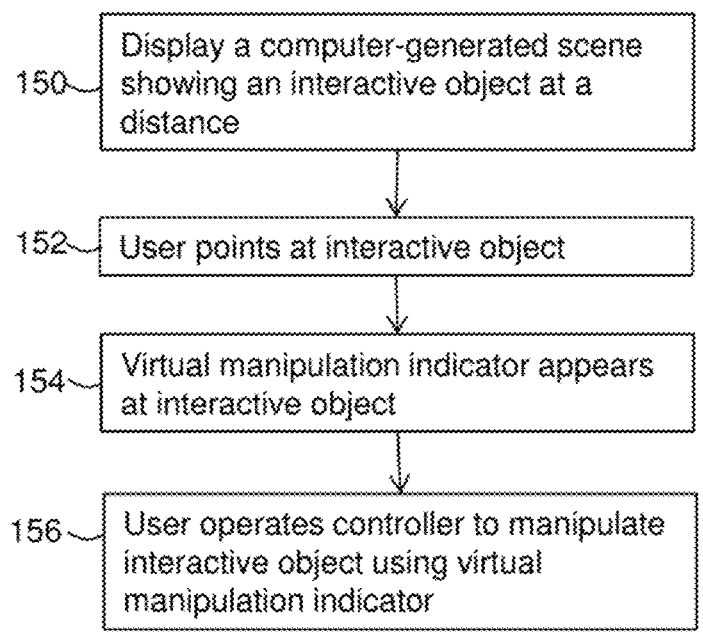
Figure 24:
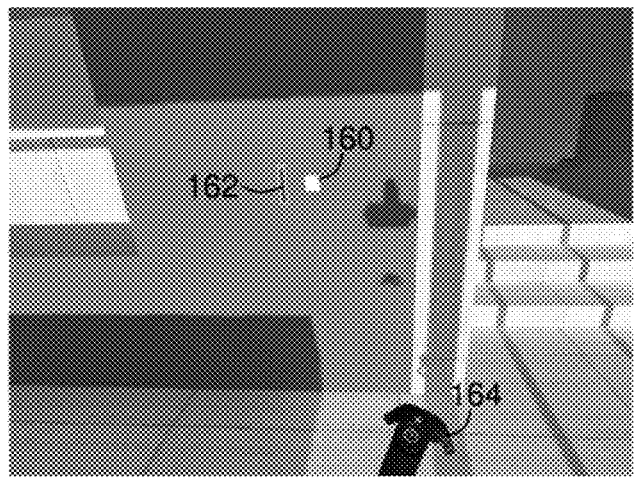
Figure 25:
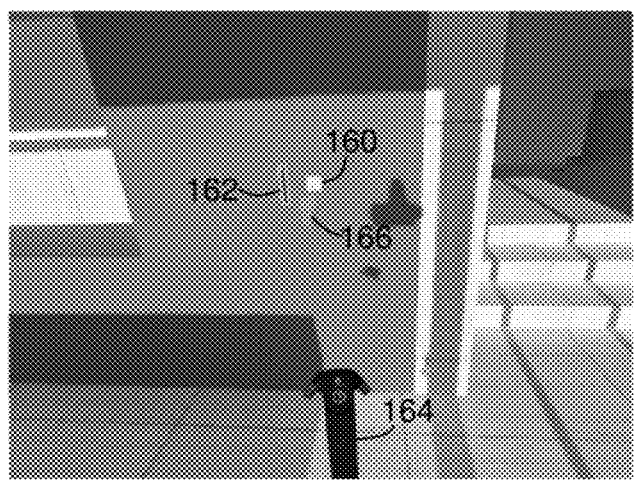
Figure 26:
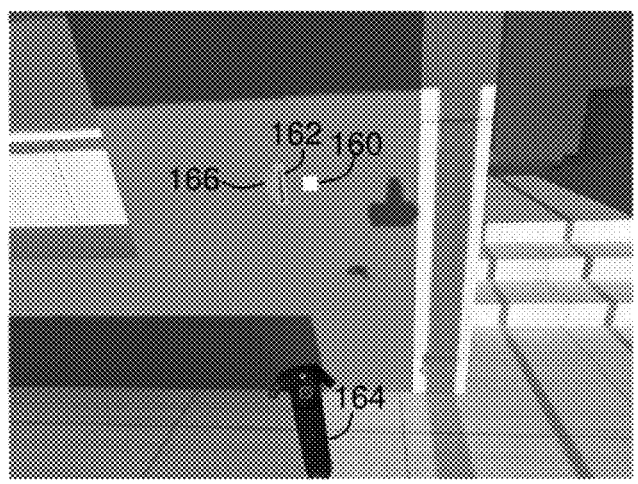

FIG. 15 in an illustration of a screen shot showing a second part of an annotation;

FIG. 16 is a flow chart illustrating on overview a movement method;

FIG. 17 is an illustration of a screen shot showing a first viewing position on a table and a second viewing position below the table;

FIG. 18 is an illustration of a screen shot viewed from the first viewing position on the table;

FIG. 19 is an illustration of a screen shot viewed from the second viewing position below the table;

FIG. 20 is an illustration of a screen shot showing a balcony;

FIG. 21 is an illustration of a screen shot from a viewing position beside the balcony;

FIG. 22 is an illustration of a screen shot from a viewing position leaning over the balcony;

FIG. 23 is a flow chart illustrating in overview a method of interacting with a remote object;

FIG. 24 is an illustration of a screen shot showing a remote light switch, a remote slider, and a controller;

FIG. 25 is an illustration of a screen shot showing a virtual hand next to the remote light switch; and FIG. 26 is an illustration of a screen shot showing the virtual hand next to the remote slider.

Figure 1:
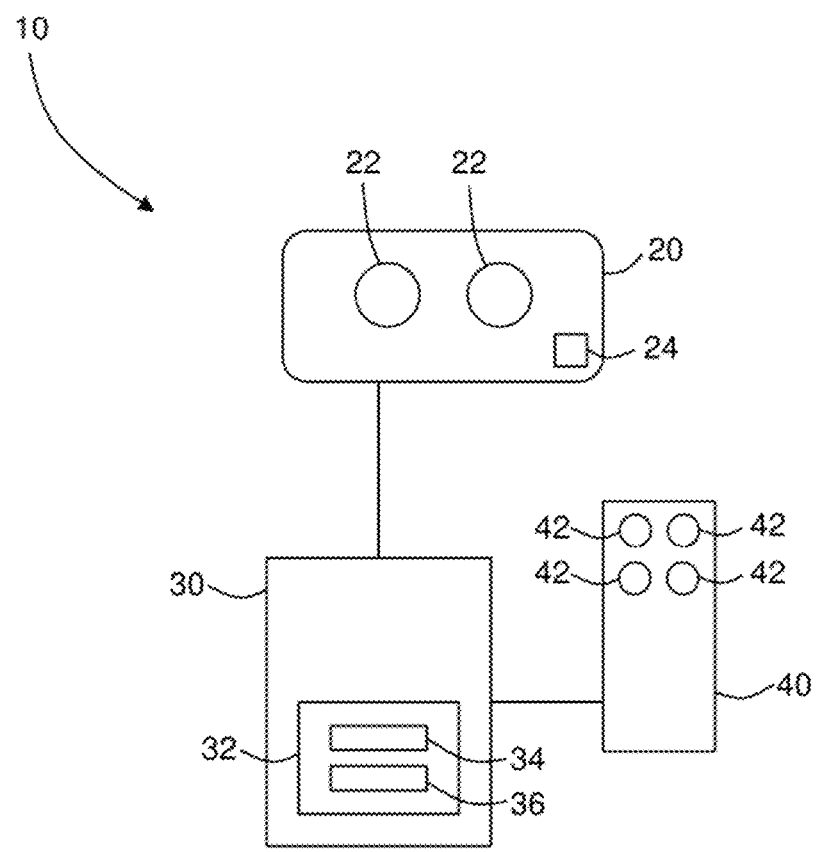
FIG. 1 is a schematic illustration of an apparatus in accordance with an embodiment.

FIG. 1 is a schematic illustration of a virtual reality apparatus 10 in accordance with an embodiment. The virtual reality apparatus 10 comprises a virtual reality headset 20, computing apparatus 30, and input device 40.

In the present embodiment, virtual reality headset 20 is a head-mounted display (which in this embodiment is a HTC Vive virtual reality headset) configured to be worn on a user's head. Virtual reality headset 20 comprises two screens 22 for displaying visual content to a user's eyes such that the user perceives the visual content as being in three dimensions. Virtual reality headset 20 may also comprise optical components (not shown), for example optical components for making the screens 22 appear to be further from the user than they actually are and/or optical components for correcting the image presented on the screens 22. In other embodiments, any suitable display screen or screens and any suitable optical components may be used.

Virtual reality headset 20 further comprises a sensor or sensors 24 configured to determine a position of the virtual reality headset 20. The position of the virtual reality headset 20 may be considered to be representative of a position of the user's head. In the present embodiment, the sensors 24 comprise an accelerometer and a gyroscope. In other embodiments, any suitable type and number of sensors 24 may be used. In further embodiments, no sensors 24 may be used. In some embodiments, a position of the virtual reality headset 20 is determined using one or more sensors or other components that are not part of the virtual reality headset 20, for example by using a camera or other tracking device that monitors a position of the virtual reality headset 20 from a distance.

Virtual reality headset 20 may comprise any suitable virtual reality or augmented reality headset, for example an Oculus Rift or HTC Vive virtual reality headset. Virtual reality headset 20 may comprise a smartphone headset, for example Google Cardboard.

In the present embodiment, virtual reality headset 20 is connected to computing apparatus 30 by a wireless connection. In other embodiments, virtual reality headset 20 may be connected to computing apparatus 30 by any suitable wired or wireless connection.

In the present embodiment, computing apparatus 30 is a personal computer (PC). In other embodiments, computing apparatus 30 may be any suitable computing apparatus or combination of computing apparatuses. Computing apparatus 30 comprises a processor 32 that is configured to provide images for display on screens 22 of virtual reality headset 20. In the present embodiment, the processor 32 is configured to provide a live feed of images, for example a feed of images at at least 45 frames a second. In some circumstances, virtual reality applications may use a higher frame rate than non-virtual reality media. Such a higher frame rate may be a component of the virtual reality system feeling immersive to the user.

The processor 32 comprises a memory 34 configured to store a representation of a three-dimensional scene and a graphics processing unit 36 configured to produce images of the three-dimensional scene for display. In some embodiments, features of a virtual reality representation provided by the processor 32 may correspond to one or more features described in the Oculus Rift Best Practices document, https://developer3.oculus.com/documentation/intro-vr/latest/concepts/bp_intro/.

The processor 32 may also comprise scene creation circuitry configured to create the representation of the three-dimensional scene. The three-dimensional scene may be representative of a real-world environment, for example the interior of a building. The scene may comprise multiple computer-generated objects, for example objects representative of walls, floors, ceilings, furniture and accessories. Each object may be modelled independently. The objects may be represented in 3D. For example, objects may be represented as polygonal meshes, which may also be referred to as a wire-frame representation. Objects may be represented as a combination of geometrical shapes. Objects may be represented as a combination of surfaces. Objects may be defined in a three-dimensional coordinate system of the scene.

The graphics processing unit 36 may comprise lighting circuitry configured to produce lighting effects and/or rendering circuitry configured for image rendering. Images of the three-dimensional scene may be rendered as if viewed from a viewing position having a coordinate position that is inside the three-dimensional scene. When an image of the scene is rendered, it may show only a part of the scene, for example an individual room of a building. Objects within the scene may be rendered with any suitable image effects. For example, objects may be rendered as opaque or as at least partially transparent. Objects may be rendered with particular colours and/or textures, which may or may not be realistic. Lighting effects may simulate lighting from light fixtures and/or external light, for example light arriving through windows. Any suitable lighting methods may be used, for example ray casting or global illumination. The lighting circuitry may simulate effects of reflection and/or refraction of light.

The graphics processing unit 36 is configured to produce a sequence of images in real time which provide the effect of the user being positioned in the three-dimensional scene. The images are rendered so as to provide a three-dimensional display by providing different input to each screen 22 of the virtual reality headset 20, giving the user the impression that they are viewing a three-dimensional environment in perspective view. The user may have an experience of being immersed in the virtual environment. A realistic effect of being in the environment may be provided to the user.

The user may move through the computer-generated scene by various means, for example by using the user input device 40 as described below. The user may move in the coordinate space of the three-dimensional scene from a first viewing position to further viewing positions. As the user moves through the scene, the rendered images change in response to the change in viewing position within the scene. For example, the user may view the objects in the scene from different angles and/or distances.

In some embodiments, objects within the three-dimensional scene may be moveable. Some objects may be manipulated by a user. Properties of an object may be changed, for example a size, colour, transparency or texture of an object. The processor 32 may comprise object evolution circuitry configured to make changes to objects and/or record the current status of objects. The processor 32 may comprise physics circuitry configured to simulate physical effects on objects, for example by making objects obey gravity. The physics circuitry may control interactions of objects with other objects, for example by causing an object to be stopped or deflected when it contacts another object, rather than passing through that object. In a games context, the provision of realistic physical interactions may be referred to as games physics.

The scene may be regenerated over time in response to inputs from the user. For example, the user may change the position of an item within the scene or annotate the scene. Object properties may be recalculated to provide an updated scene, and images of the updated scene may be rendered by the graphics processing unit 36.

The processor 32 may comprise input circuitry configured to process inputs from the input device 40 and/or from other input devices. The processor 32 may comprise movement circuitry configured to monitor movement of a user, for example in dependence on input from sensors 24 of the virtual reality headset 20 and/or orientation circuitry configured to monitor an orientation of the user, for example in dependence on input from sensors 24.

Computing apparatus 30 (for example, input circuitry of the processor 32) is configured to receive inputs from the sensors 24 and from the user input device 40. Computing apparatus 30 (for example, the graphics processing unit 36) is configured to provide images generated in dependence on the inputs from the sensors 24 and from the user input device 40. In further embodiments, computing apparatus 30 is configured to receive further inputs, and to provide images generated in dependence on those further inputs. For example, the computing apparatus 30 may further receive further inputs from at least one further input device (for example, a mouse, keyboard or trackball); from further sensors or other components; from a camera or other tracking device; and/or from at least one further computing apparatus.

Computing apparatus 30 also includes a hard drive and other components including RAM, ROM, a data bus, an operating system including various device drivers, and hardware devices including a graphics card. Such components are not shown in FIG. 1 for clarity.

Input device 40 is configured to be used by the user for inputting commands to computing apparatus 30. In the present embodiment, input device 40 is a wand comprising a plurality of buttons 42 that may be pressed by the user to provide input commands. In other embodiments, the input device 40 may be any handheld device, for example a wand or games controller. In further embodiments, the input device 40 may be any suitable input device, for example a keyboard, mouse or joystick.

In the present embodiment, input device 40 is connected to computing apparatus 30 by a wireless connection. In other embodiments, input device 40 may be connected to computing apparatus 30 and/or to virtual reality headset 20 by any suitable wired or wireless connection.

In the present embodiment, the computing apparatus 30 provides visual content to the screens 22 of the virtual reality headset 20. The user wears the virtual reality headset 20 and views the visual content via the screens 22. In further embodiments, the computing apparatus 30 provides visual content to one or more display screens that are not part of the virtual reality headset, for example 3D television screens or computer monitors. In some embodiments, no virtual reality headset 20 is used. In some embodiments, one user views the visual content via the virtual reality headset 20 and another user views the visual content via one or more further screens that are not part of the virtual reality headset 20. In some embodiments, multiple users may each view the visual content through a respective virtual reality headset 20.

The apparatus of FIG. 1 is configured to perform the processes of FIGS. 2, 5, 9, 13, 16 and 23, each of which is described in turn below.

In each of the processes of FIGS. 2, 5, 9, 13, 16 and 23, the visual content provided to the user is representative of an architectural structure in a geographical location. For example, the visual content may be representative of a proposed building that has not yet been built, or of proposed modifications to an existing building. The user may be an architectural client, architect, surveyor, planner, builder, or any other appropriate user. The use of virtual reality may allow the user to view the building as if it were already built or modified. Virtual reality may allow an immersive experience in which the user can move around a proposed building. In some embodiments, a virtual reality representation of the building may allow the user to see the building in context, for example placed in its proposed surroundings.

In other embodiments, the virtual content may be representative of any suitable structure. The methods described below may be used in, for example, design, gaming, or educational or training fields.

Figure 2:
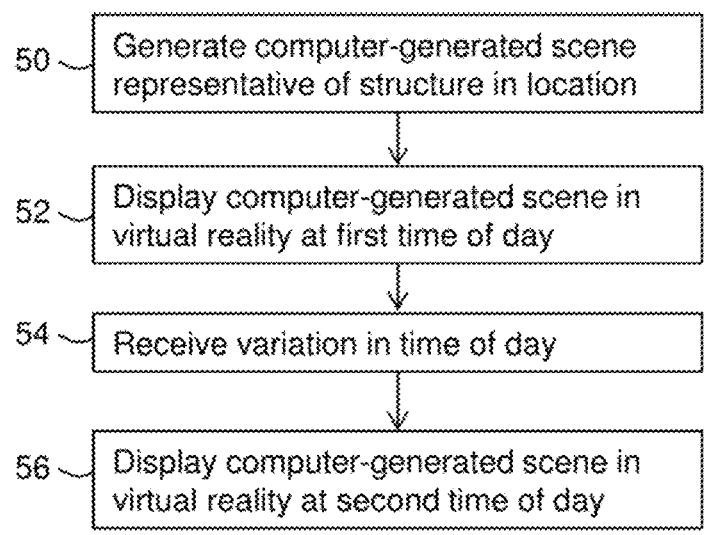
FIG. 2 is a flow chart illustrating in overview a method of an embodiment comprising varying a time parameter.

FIG. 2 is a flow chart illustrating in overview a method of an embodiment. At stage 50 of the flow chart of FIG. 2, the processor 32 generates a computer-generated scene representative of an architectural structure in a geographical location, and of a geographical area surrounding the geographical location. In the present embodiment, the structure is a house that has not yet been built, and the geographical location is a proposed site for the house. The geographical area surrounding the geographical location is based on the current surroundings of the proposed site for the house. In further embodiments, the geographical area surrounding the house may not be shown.

The processor 32 represents the house as a plurality of computer-generated objects, for example, objects representative of walls, floors, ceilings, and furniture. The processor 32 may also represent at least part of the geographical area surrounding the proposed site for the house as a plurality of computer-generated objects, for example objects representative of other buildings.

At stage 52, the processor 32 displays the computer-generated scene in virtual reality by rendering a series of images of the scene that are representative of the scene as viewed from a viewing position. The viewing position may change as a user moves through the scene in virtual reality (for example, by inputting movement commands or by making physical movements).

In the display of stage 52, the processor 32 displays the scene as if viewed at a first time of day. The first time of day may be stored in the processor 32, automatically generated, or selected by a user. In the present embodiment, the processor 32 determines a first sun position based on the first time of day and geographical location, and uses the determined sun position to determine parameters of sunlight which are used in the display of the scene of stage 52, for example a direction and strength of sunlight. In some embodiments, the processor 32 determines the first sun position based on a time of year in addition to the time of day and geographical location. In some embodiments, the geographical location used may be an approximate or generic geographical location instead of a geographical location at which the building is to be placed.

Figure 3:
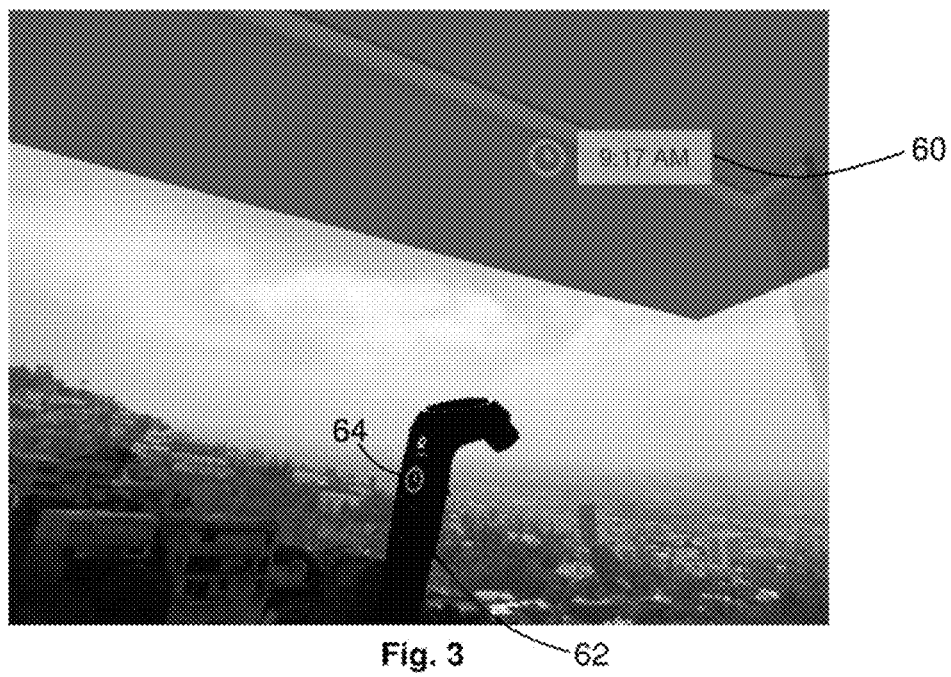
FIG. 3 is an illustration of a screen shot representative of a first time of day.

FIG. 3 is an illustration showing the scene at the first time of day, which in FIG. 3 is 9:17 am. FIG. 3 is a screen shot shown as if viewed by a user who is wearing a virtual reality headset 20. The display of the scene comprises a time display 60 indicating the first time of day, 9:17 am. Since the first time of day is during daytime, part of the geographical area surrounding the house is visible through a window of the house in FIG. 3.

The user is holding a handheld input device 40, which is represented in the display shown in FIG. 3 by virtual handheld input device 62. The handheld image device 40 comprises a button 44 (represented by button 64 in FIG. 3) which is designated for time control. In other embodiments, any suitable input device may be used.

At stage 54 of the process of FIG. 2, the processor 32 receives an input from the user via button 44 of the handheld device 40. The input is representative of a variation in the time of day. In the present embodiment, the user indicates a variation in time of day by pressing down button 44. Pressing down button 44 causes the time shown on the time of day display 60 to increase. The time shown on the time of day display 60 stops decreasing when the user stops pressing the button. In other embodiments, the user may operate any suitable user input tool to provide an input that is representative of an increment in time, or of a particular selected time. For example, the user may hold down a button, slide a slider, or press a pressure-sensitive device. The user may type in a time or select a time from a list.

At stage 56, the processor 32 displays the scene as if viewed at a second time of day. The second time of day is determined based on the user input. In the present embodiment, the second time of day is the time of day at which the user stopped pressing the button, which in the example shown is 10:16 pm. The processor 32 determines a second sun position based on the second time of day and geographical location. In this example, the processor 32 determines that the sun is below the horizon and so no sunlight is present in the scene.

Figure 4:
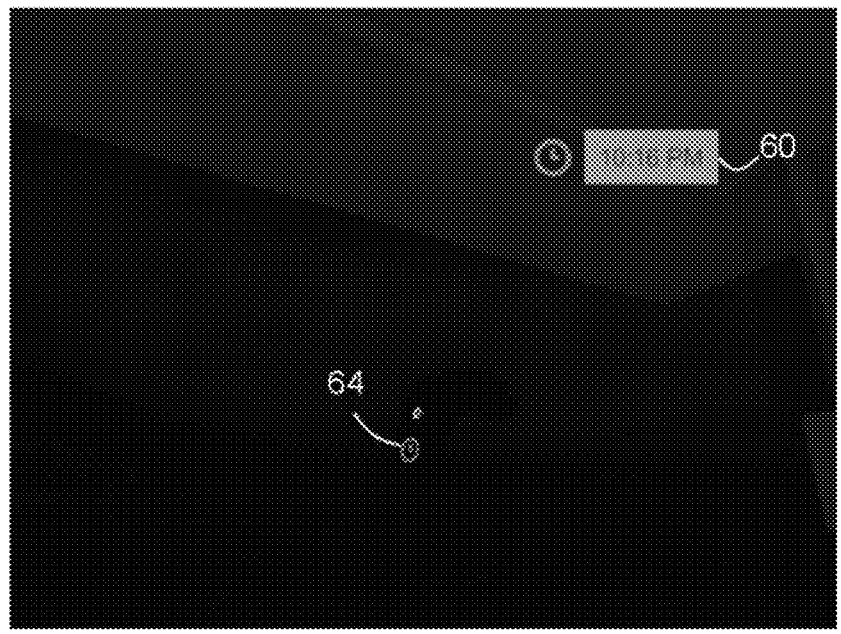
FIG. 4 is an illustration of a screen shot representative of a second time of day.

FIG. 4 is an illustration showing the scene at the second time of day, 10:16 pm. FIG. 4 is a screen shot shown as if viewed by a user who is wearing a virtual reality headset 20. The display of the scene comprises the time display 60 which now indicates the second time of day, 10:16 pm. The display is dark and the geographical area cannot be seen through the window.

In the present embodiment, the scene is shown as dark when it is night time (for example, at 10:16 pm as shown in FIG. 4). In other embodiments, the displayed scene shows lights in the geographical area (for example, simulated house lights or street lights) and/or within the house. For example, if the house is shown at 10:16 pm, it may automatically be shown with some interior lighting turned on.

In some embodiments, the processor 32 calculates a position of the moon and/or positions of stars or planets based on a time of day and/or time of year and geographical location, and displays the moon, stars or planets at times that the moon, stars or planets would be visible from the geographical location.

Updating the computer scene in dependence on a variation of time of day may enable the user to vary on command an appearance of at least part of the house in the computer-generated scene. In the present embodiment, the processor 32 receives the input indicating the change in time and then changes the display to represent the change in time, without showing the scene at intermediate times. In other embodiments, the display of the scene changes in real time while the user presses the button. The display shows the scene at a succession of times between the first time of day and the second time of day. For example, the user may see the sun rise and/or set while the user presses the button to move forward through time. The display may change in a manner that is similar to a time-lapse video.

By holding down a button 44 on the controller 40, the user can directly control the time of day in the virtual world. The time of day in the virtual world is indicated by the time display (which may be referred to as a heads-up display time display or HUD time display). The time of day in the virtual world may also be indicated by in-world lighting.

In the embodiment described above with reference to FIGS. 2 to 4, the user provides an input representative of a change in time of day. In other embodiments, the user provides an input representative of a change in time of year. In further embodiment, the user provides an input representative of a change in at least one weather parameter.

A calendar display indicating a time of year may be displayed to the user. A map showing the geographical location may be displayed to the user. An icon or other display showing weather conditions may be displayed to the user.

In some embodiments, the processor 32 receives a user input representative of a variation in at least one weather parameter. For example, the user input may be provided by pressing a button on handheld input device 40 (which may or may not be the same button 44 as a button used to provide time input), selecting a weather parameter from a list, typing in a text input, or by any suitable method. The processor 32 processes the user input and makes a change in the weather represented in the computer-generated scene in dependence on the user input. For example, the processor 32 may change an extent of cloud coverage, a type of precipitation, a rate of precipitation, an amount of fog or an amount of smog.

In further embodiments, the processor 32 determines at least one weather parameter based on a time of day and/or on a time of year. For example, the processor 32 may obtain typical weather conditions for a selected time of day and/or time of year and display the computer-generated scene having typical weather.

Allowing the user to change a type of weather may allow the user to see how the house looks in different weather conditions. Different weather conditions may affect an amount or quality of light coming into the house. An updating of the weather conditions may be provided in real time.

In other embodiments, the method of FIG. 2 may be used for a virtual reality application that comprises displaying any architectural structure. In further embodiments, the method of FIG. 2 may be used for any suitable virtual reality application, for example for gaming. The method of FIG. 2 may be used for virtual maps and/or virtual tourism. Any appropriate location may be represented in virtual reality with current or predicted lighting or weather conditions.

Figure 5:
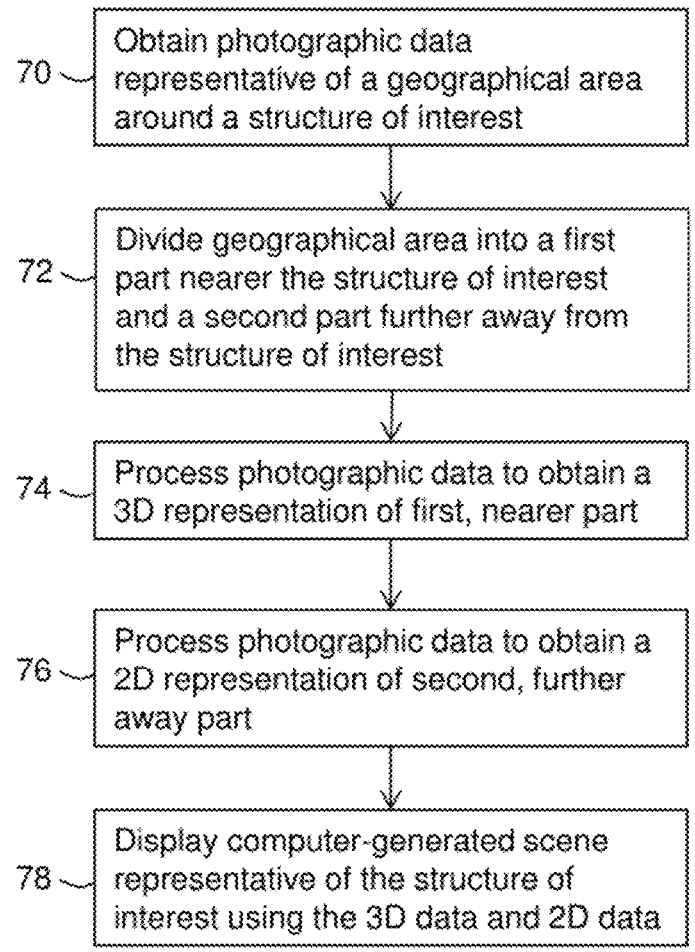
FIG. 5 is a flow chart illustrating in overview a method of an embodiment comprising obtaining representations of a geographical area from photographic data.

FIG. 5 is a flow chart illustrating in overview a method of an embodiment. At stage 70 of FIG. 5, the processor 32 obtains photographic data representative of a geographical area around a structure of interest. In the present embodiment, the structure of interest is a house that has not yet been built. The geographical area is an area around a proposed site of the house.

In the present embodiment, the photographic data is representative of a geographical area that surrounds the house on all sides and extends to the furthest distance that can be seen from the house. In other embodiments, the geographical area may be any geographical area that surrounds or is adjacent to the structure of interest.

In some embodiments, the geographical area is an area within a fixed threshold distance from the structure of interest. In some embodiments, the geographical area includes all structures that are viewable from the house.

In some embodiments, the extent of the geographical area is different in different directions. For example, the house may not have windows on one side, or may look out onto a nearby building on that side. In such a case, the extent of the geographical area on that side of the house may be limited. In some circumstances, a view from the house may be blocked in one direction by a geographical feature, for example a hill, and the geographical area may extend only as far as that geographical feature.

In the present embodiment, the geographical area is determined manually. In other embodiments, the geographical area may be determined automatically or semi-automatically.

In the present embodiment, the photographic data is aerial data that has been obtained using a drone. A large range of imagery is captured via a drone over multiple flights in one short time period (for example, a time period of an hour). The photographic data comprises a plurality of two-dimensional photographic images. The photographic data includes images of all of the geographical area. At least some of the two-dimensional images may have been taken from an aerial location near the house. In the present embodiment, the aerial data is taken specifically to be used for the virtual display of the house. In other embodiments, existing aerial data may be used.

The photographic data comprises imagery from multiple angles and positions. In the present embodiment, the photographic data is drone-captured aerial photography which captures imagery from positions including positions that are not currently accessible via a structure. The photographic data comprises high-resolution colour photographs.

At stage 72, the processor 32 divides the geographical area into a first part near the structure of interest, and a second part that is further away from the structure of interest than the first part. In the present embodiment, the geographical area surrounds the structure of interest. The first part of the geographical area is the part of the geographical area that is within a threshold distance of the structure of interest, for example within 400 metres of the structure of interest. The second part of the geographical area is the part of the geographical area that is outside the threshold distance.

In other embodiments, the threshold distance varies with angle around the house. In further embodiments, a criterion other than threshold distance is used to divide the geographical area into first and second parts. For example, the geographical area may be divided based on the presence of structures in different parts of the geographical area, or on characteristics of those structures.

In the present embodiment, the geographical area comprises a plurality of structures, including other houses and other buildings. Each structure of the plurality of structures is assigned to either the first part of the geographical area or the second part of the geographical area. In the present embodiment, the structures are assigned based on distance from the house. Structures within 400 metres of the house are assigned to the first part and structures more than 400 metres from the house are assigned to the second part. In other embodiments, structures may be assigned to the first or the second part based on their size or importance. For example, the first part may comprise structures that are within a threshold distance from the house and some large and/or important structures that are outside the threshold distance.

In some embodiments, the geographical area is divided into a first part and second part before the photographic data is obtained. For example, the geographical area may be divided based on known mapping data.

At stage 74, the processor 32 processes the photographic data to obtain a three-dimensional representation of the first part of the geographical area. The processor 32 thereby obtains a three-dimensional representation of structures that are near to the house, for example nearby buildings.

Any suitable processing method may be used to obtain the three-dimensional representation, for example any suitable photogrammetry method. In some embodiments, the processing uses further data in addition to the photographic data. The further data may comprise, for example, GPS data, mapping data, laser data or radar data.

At stage 76, the processor 32 processes the photographic data to obtain a two-dimensional representation of the second part of the geographical area. In the present embodiment, the two-dimensional representation is a panoramic image of the second part of the geographical area as if viewed from a viewing point that is within or near the house.

In other embodiments, the processing of the photographic data may be performed using any suitable computing apparatus, which may or may not be computing apparatus 30. In one embodiment, a PC is used to run the virtual reality, while a further computing apparatus processes the photographic data by performing photogrammetry. The further computing apparatus performs the photogrammetry in an offline process using photogrammetry tools. The generated geometry and textures from the photogrammetry process are used in stage 78.

At stage 78, the processor 32 generates a computer-generated scene representative of the house, and of the geographical area surrounding the geographical area. In the computer-generated scene, the first part of the geographical area is represented by the three-dimensional representation obtained at stage 74, and the second part of the geographical area is represented by the two-dimensional representation obtained at stage 76. The processor 32 displays the scene in virtual reality by rendering a series of images of the scene that are representative of the scene as viewed from a viewing position.

The viewing position from which the scene is rendered may or may not be the same as the viewing position from which the two-dimensional representation was determined. However, the second part of the geographical area may be far enough away from the house that a small change in viewing position (for example, a change from a first viewing position within or near the house to a second viewing position within or near the house) may not change significantly an appearance of structures in the far distance. Therefore, the two-dimensional representation may provide an adequate representation of structures in the far distance when viewed from any viewing position that is within or near the house.

Figure 6:
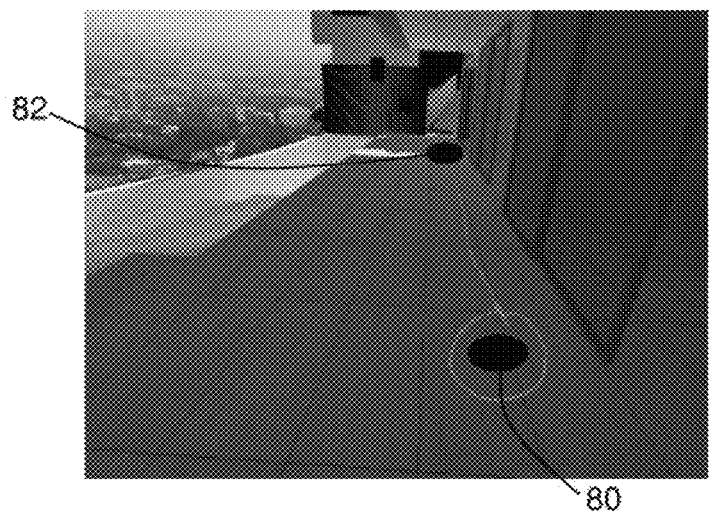
FIG. 6 is an illustration of a screen shot showing a first and second location on a structure.

FIG. 6 is an illustration showing a computer-generated scene in which two viewing positions 80, 82 are marked. The scene is representative of a balcony, and the two viewing positions 80, 82 are different points on the balcony. In practice, the scene is rendered as if viewed from a distance above the marked viewing positions 80, 82, the distance corresponding to a user's height.

Figure 7:
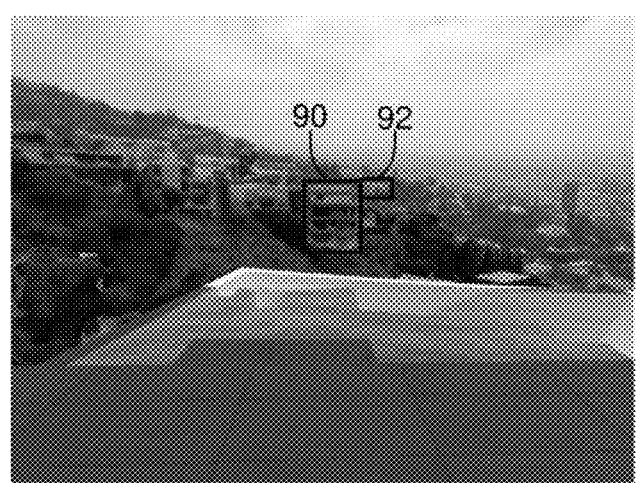
FIG. 7 is an illustration of a screen shot showing a view from the first location on the structure.

FIG. 7 is an illustration showing a view of the computer-generated scene as viewed from the first viewing position 80. Two buildings 90, 92 are highlighted in FIG. 7 by outlining. Building 90 is within the threshold distance from the house, and so is in the first part of the geographical area. Building 90 is represented in 3D geometry. Building 92 is outside the threshold distance from the house, and so is in the second part of the geographical area. Building 92 is represented in a static panoramic image.

Figure 8:
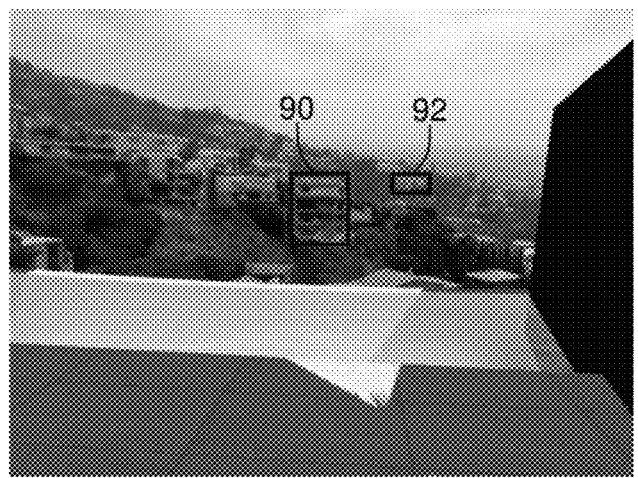
FIG. 8 is an illustration of a screen shot showing a view from the second location on the structure.

FIG. 8 is an illustration showing a view of the computer-generated scene as viewed from the second viewing position 82. The same two buildings 90, 92 as were highlighted in FIG. 7 are also highlighted in FIG. 8. It may be seen that, by changing viewing position from the first viewing position 80 to the second viewing position 82, there is a change in an apparent position of building 92 relative to building 90. The change in apparatus position may be referred to as a parallax effect.

In FIGS. 7 and 8, the large highlighted building 90 is 3D geometry and the smaller highlighted building 92 is a static photograph. The relative positions of buildings 90 and 92 change due to parallax between FIGS. 7 and 8. However, the distant building 2 does not move relative to even further objects. All buildings in FIGS. 7 and 8 may be considered to have a very similar visual appearance.

In the embodiment described above with reference to FIGS. 5 to 8, a representative view outside the property (in this embodiment, the house) is created. The representative view outside the house is created using 3D geometry of nearby buildings, which in this embodiment are buildings in the first part of the geographical area. Buildings in the first part of the geographical area are within a threshold distance from the house.

In some circumstances, using a 3D model into the far distance may be impractical for performance reasons. Using a separate solution for near buildings than for far buildings may in some circumstances risk a visual mismatch. However, in this embodiment, we take a single set of drone-captured imagery from around the property, and create a 3D model of near buildings, and a single static panoramic image of the far distance. Because the 3D model and panoramic image are sourced from the same data, they may provide a close visual match.

In some embodiments, one part of the photographic data is used to generate 3D models and a different part of the photographic data is used for the 2D panorama. If the different parts of the photographic data are taken using the same drone, in the same broad location, and at roughly the same time of day, the 3D and 2D images may still match.

The technique of FIG. 5 may be used with very closely matched data, for example data captured from a very close location at a similar time of day with similar camera settings. In some embodiments, different photographic data is used to generate the 3D representation from the data used to generate the 2D representation, but the photographic data used is matched in time of day and/or settings.

In other embodiments, the method of FIG. 5 may be used for any suitable virtual reality application, for example in games in which a real-world environment is simulated. The method of FIG. 5 may be used for virtual maps or virtual tourism.

Figure 9:
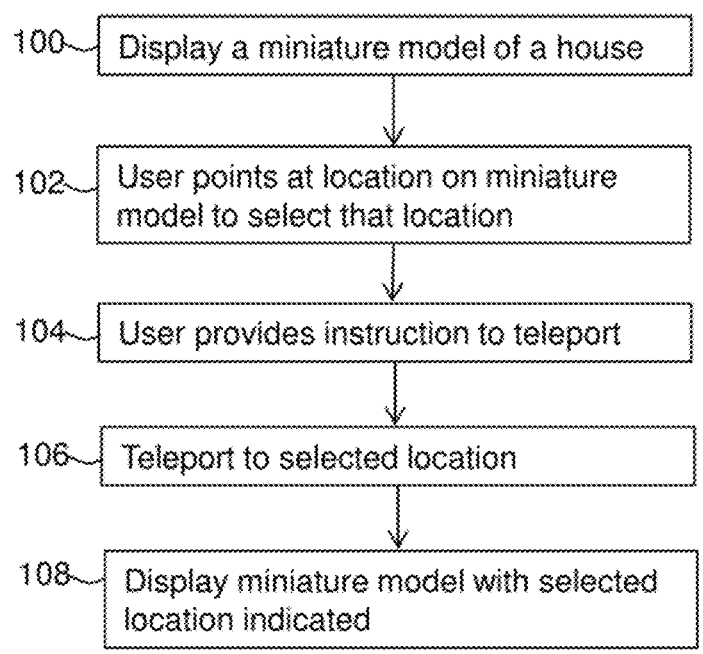
FIG. 9 is a flow chart illustrating in overview a method of an embodiment in which a user moves by selecting a location on a miniature model.

FIG. 9 is a flow chart illustrating in overview a method of an embodiment. In the embodiment of FIG. 9, a user moves around a computer-generated scene by pointing a wand head at a location in a miniature model of a building. To move around the building, the miniature model of the building is displayed, and a controller is used to point to the location that the user wishes to move to.

At stage 100, the processor 32 generates a computer-generated scene representative of at least part of a house. The processor 32 displays the scene in virtual reality by rendering a series of images of the scene that are representative of the scene as viewed from a first viewing position.

The computer-generated scene comprises a miniature model of the house. The scene is presented such that the miniature model of the house appears to be displayed in a part of the house or in a space associated with the house. For example, the miniature model may be displayed in a room of the house, or in an outdoor space such as a balcony or garden.

The miniature model of the house is presented at a first, smaller scale. A part of the house in which the miniature model appears to be displayed is displayed at a second, larger scale.

In other embodiments, the miniature model may be presented alone. The miniature model may not be presented in a room of the house or in a space associated with the house. For example, the miniature model may be presented on a solid-colour background or as part of a navigation screen.

Figure 10:
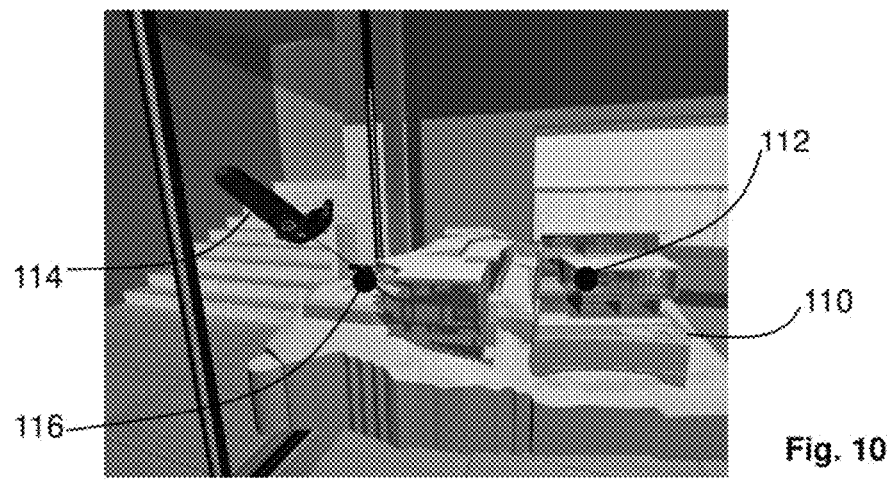
FIG. 10 is an illustration of a screen shot showing a miniature model on which is marked a current location and a selected location.

FIG. 10 shows a miniature model 110 in a room of a house. The computer-generated scene representative of the room of the house is displayed as if viewed from a viewing position within the room. In FIG. 10, the viewing position within the room is indicated in the miniature model by a first circle 112. In an embodiment, the user's current position is indicated in the miniature model 110 by a green sphere. The user can therefore see in the miniature model a position in the house from which the user is viewing the house. The user may therefore understand how the parts of the house that they can see from the viewing position relate to other parts of the house. The user may simultaneously see representations of the house at two different scales At stage 102, the user selects a location on the miniature model that is representative of a further viewing position. The further viewing position may be within the same room as the viewing position of stage 100, within a different room of the house, or in a space associated with the house.

In the present embodiment, the user selects the further viewing position using a virtual wand 114 (which corresponds to real-life input device 40). The user selects the further viewing position by pointing the wand 114 at the miniature model to select a location on the miniature model 100. In other embodiments, any input device, for example any handheld input device, may be used to select the further viewing position. Any suitable method may be used to select the further viewing position. In some embodiments, the further viewing position is selected using a gaze interface in which the user provides a user input by looking at a specific location and holding down a button for a period of time. For example, the user may keep the centre of their vision focused on a specific room or location in the miniature model while holding a button to teleport to that location.

FIG. 10 shows the wand 114 of the present embodiment. Wand 114 is shown pointing to a selected location on the miniature model 110. The selected location is indicated as a second circle 116. The second location is next to the pool. In some embodiments, the second location is indicated by a red sphere at the wand head, or by a red sphere at a position that is pointed to by the wand head.

At stage 104, the user provides an instruction to teleport to the second viewing position. In the present embodiment, the user provides the instruction to teleport by pressing a button on the wand 114. In other embodiments, the user may provide the instruction to teleport using any suitable input method.

At stage 106, the processor 32 displays the computer-generated scene (or another computer-generated scene) as if viewed from the further viewing position, thereby teleporting the user to the further viewing position. The further viewing position is a position within the scene at the second, larger scale that corresponds to the selected location in the miniature model.

Figure 11:
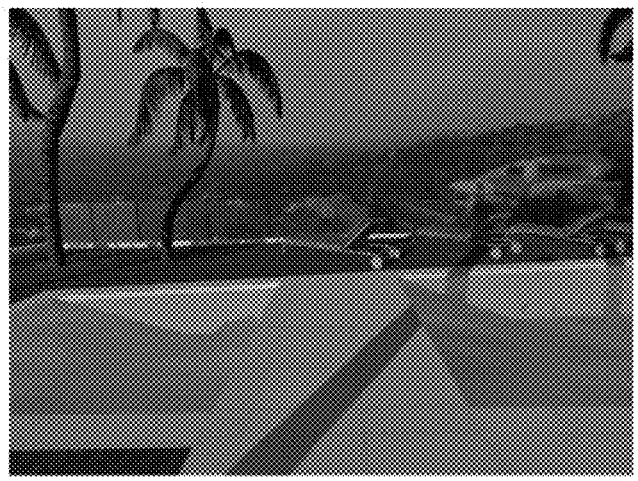
FIG. 11 is an illustration of a screen shot of the selected location.

FIG. 11 is a computer-generated scene viewed from the location that was selected in FIG. 10 using the wand 114 and represented by second circle 116, i.e. from a location next to the pool.

In the present embodiment, the user selects a location in the miniature model and the processor 32 displays the computer-generated scene as if viewed from a further viewing position that corresponds to the selected location. In other embodiments, the user selects a location in the miniature model and the processor displays the computer-generated scene as if viewed from a viewing position in the structure that is selected in dependence on the selected location in the miniature model. For example, the viewing position may be a viewing position from which it is possible to look at a location in the structure that corresponds to the selected location in the miniature model.

At stage 108, the processor 32 displays the miniature model in the computer-generated scene of stage 106. In some embodiments, the display of the miniature model is similar to the display at stage 100. For example, the miniature model may be viewed from the same viewing angle. In other embodiments, the display of the miniature model may be different. For example, the miniature model may be viewed at a different angle or at a different scale. In some embodiments, the display of the miniature model (for example, a display angle or scale) is controllable by the user.

Figure 12:
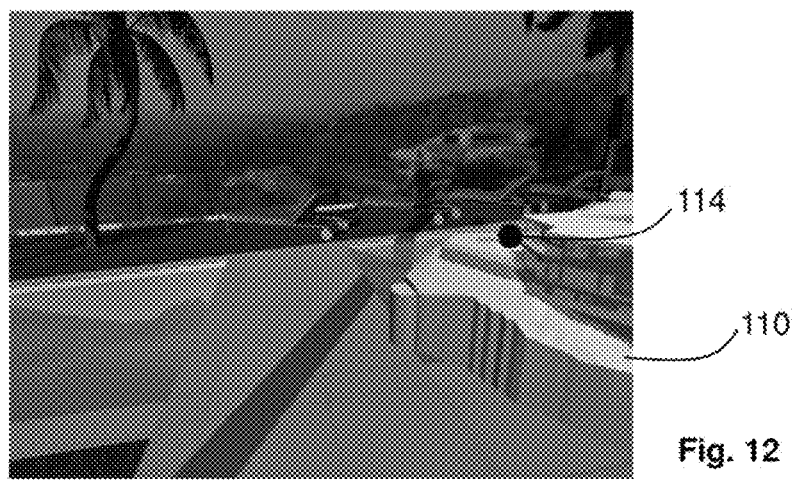
FIG. 12 is an illustration of a screen shot of the selected location with the miniature model displayed.

FIG. 12 shows the scene as viewed from the further viewing position of FIG. 11 with the miniature model 110 included in the scene. The further viewing position is indicated by circle 114. In some embodiments, the indication of the further viewing position changes colour to show that the scene is now being viewed from the further viewing position. For example, the further viewing position beside the pool may appear as a red sphere when it is selected (for example, in a display such as the display of FIG. 10) and may appear as a green sphere when the scene is being viewed from the further viewing position (for example, in a display such as the display of FIG. 12).

In some embodiments, stage 108 is omitted. When the user teleports, the user sees the scene as if viewed from the further viewing position, without the presence of the miniature model. In some such embodiments, the miniature model may be displayed in the scene at the user's request.

In some embodiments, stage 106 and stage 108 are performed simultaneously or near-simultaneously. The user may see the miniature model as soon as the user teleports to the further viewing position. In some embodiments, the user controls when the miniature model is visible. For example, the user may toggle visibility of the miniature model on and off. The user may rotate the miniature model. As the user moves round a space in the computer-generated scene (for example, a room, balcony or garden), the user may also appear to move round the miniature model. In other embodiments, as the user moves round a space in the computer-generated scene, the miniature model may appear to move relative to the scene, for example, such that the user always viewed the miniature model at a consistent angle.

In some embodiments, the miniature model is displayed permanently or semi-permanently. The display of the miniature model may persist whenever a movement or other change of display is made. The miniature model may be displayed such that it minimises any interference with the main view of the scene. For example, the miniature model may be semi-transparent and/or positioned in the corner of the scene. It may always be possible to directly interact with the miniature model in order to move around the structure.

After stage 108, the user may select another viewing position in the miniature model and teleport to that other viewing position using the method described above with reference to stages 102 to 108.

The miniature model may provide a convenient and intuitive display in which a user may understand the context of a scene or part of a scene that they are viewing. Navigating by pointing at the miniature model may provide a convenient movement mechanism around the house.

In further embodiments, the miniature model may represent more than the individual building and/or grounds in which the user appears to be standing. For example, the miniature model may represent further buildings or nearby streets. In some embodiments, the movement mechanism of FIG. 9 may allow the user to teleport to any position in the miniature model.

In further embodiments, the method of FIG. 9 may be used to navigate around any suitable structure. The method of FIG. 9 may be used in any suitable virtual reality application. The method of FIG. 9 may be used for virtual maps or virtual tourism.

Figure 13:
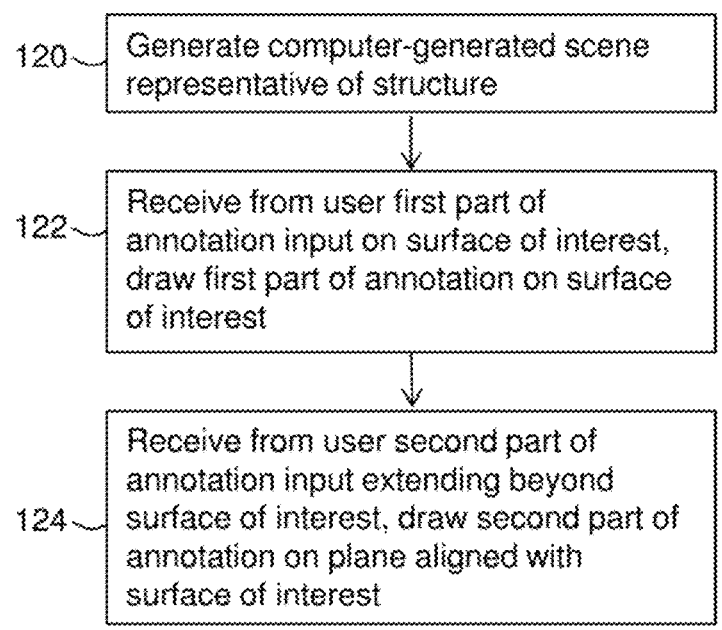
FIG. 13 is a flow chart illustrating in overview an annotation method.

FIG. 13 is a flow chart illustrating in overview a method of an embodiment. The method of FIG. 13 may provide an annotation feature where annotation is projected onto a plane if a cursor moved off the object being annotated.

At stage 120 of FIG. 13, the processor 32 generates a computer-generated scene representative of a structure. The structure comprises a plurality of surfaces, for example a floor, walls, and surfaces of objects such as furniture.

At stage 122, the user provides a first part of an annotation input representative of a first part of an annotation in the scene. In the present embodiment, the user uses a handheld input device as a virtual laser pointer. When the user moves the handheld input device, a cursor representing a light of the laser pointer moves across the scene. The cursor may be considered to represent light which is projected onto the first surface that a light beam of the laser pointer intersects, i.e. the surface that is closest to the laser pointer along its line of sight.

The user provides the first part of the annotation input by moving the cursor along a surface in the computer-generated scene, which in this embodiment is the side of a table in the computer-generated scene. The processor 32 determines that the surface on which the user starts to draw is the surface of interest. The initial use of the laser pointer on the side of the table selects that side of the table as the surface of interest.

As the user moves the cursor along the side of the table, the processor 32 draws a line onto the table in accordance with the movement of the cursor.

Figure 14:
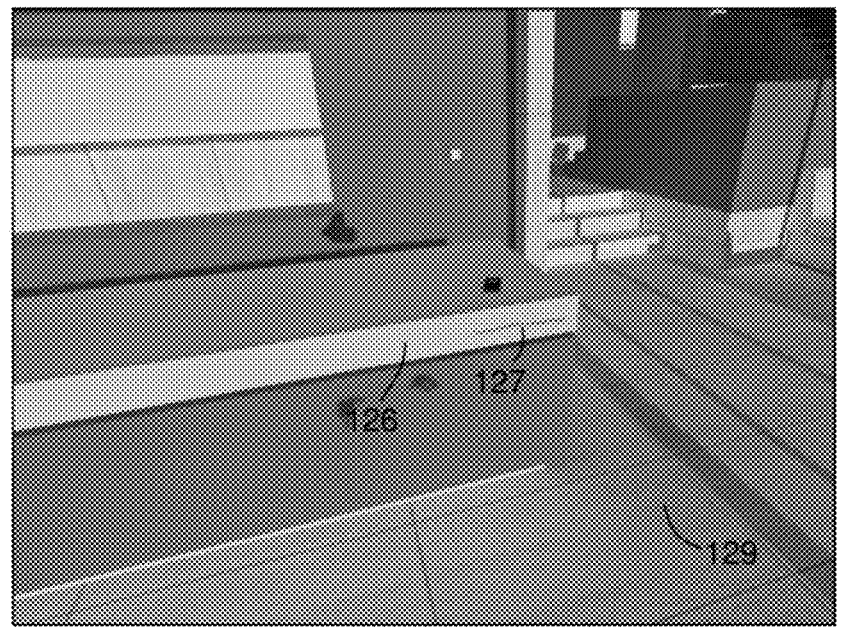
FIG. 14 is an illustration of a screen shot showing a first part of an annotation.

FIG. 14 shows a table 126 on which a line 128 has been drawn in accordance with the movement of the cursor by the user.

At stage 124, the user provides a second part of an annotation input representative of a second part of an annotation in the scene. The second part of the annotation input continues on from the first part. In some circumstances, the user may not consider the annotation to have a first part and a second part, but instead may consider the annotation input to have been provided as a continuous movement.

In the present embodiment the user provides the second part of the annotation input by continuing to move the cursor beyond the edge of the table, following a broadly rectangular path. When the cursor reaches the edge of the table, the laser light that it represents may be considered to jump from the table to the floor beside the table. At a location at which the laser light would move between surfaces, the processor 32 determines that there has been a transition between surfaces.

In the present embodiment, the processor 32 determines that there has been a significant distance change in the distance travelled by the laser light. The processor 32 compares the distance change to a threshold value. In the present embodiment, the threshold value is 25 cm. In other embodiments, the threshold value may be any suitable threshold value, for example 10 cm or 50 cm. If the distance change is greater than the threshold value, the processor 32 determines that there has been a transition between surfaces. In other embodiments, any threshold value may be used. Any method of determining a transition between surfaces may be used.

If the processor 32 were to draw the annotation as if drawn by a laser pointer, the annotation would move to the next surface that the beam of the laser pointer contacts, which in the embodiment shown in FIG. 14 is the floor 129 of the room shown in the computer-generated scene.

However, in this embodiment, the processor 32 draws the second part of the annotation as if it were drawn on an invisible plane aligned with the surface of the table on which the first part of the annotation was drawn. The annotation may represent an extension to the table.

The invisible plane may be referred to as an imaginary surface. All the surfaces in the scene are virtual surfaces. However, the invisible plane is not itself represented in the scene. In other embodiments, the processer 32 may define any imaginary surface relative to the surface of interest, which may or may not be a plane.

In the present embodiment, the invisible plane is determined using a normal vector taken from the normal of the surface of interest at a final point of the first part of the annotation input before the laser pointer jumped to the floor. In other embodiments, any normal vector for the plane may be used. A normal may be taken from the surface of interest at an initial point of annotation. A normal may be calculated as a vector perpendicular to a line connecting two previous annotation points (for example, connecting the initial and final points of annotation) and either horizontal or vertical.

In other embodiments, any method may be used for determining the plane or other imaginary surface.

FIG. 15 shows the first part 127 and second part 128 of the annotation which are both drawn on the plane of the side of the table 126. No part of the annotation is drawn on the floor 129.

If the annotation were only to be viewed from the first viewing position at which the computer-generated scene were displayed when the user was providing the annotation input, it may not matter whether the annotation were considered to be on a plane aligned with the table, or on the floor. It may still be apparent to a viewer that the user intended to indicate an extension of the table. However, the position of the annotation may be relevant if the annotation is viewed from a different viewing position, for example from a different angle.

In the present embodiment, the processor 32 displays the computer-generated scene and the annotation as if viewed from a second viewing position, such that the computer-generated scene appears to have been rotated. The line has a fixed 3D position and hence will always change appearance if the viewing position changes.

Since the second part of the annotation is in a plane aligned with the side of the table, the second part of the annotation still appears to extend beyond the table when viewed from any angle. For example, a user may virtually walk round the table and view the annotation as protruding from the end of the table no matter which viewing position is assumed by the user. The annotation may have a consistent position relative to the table in three dimensions. The maintaining of the position of the annotation in three dimensions may cause the appearance of the annotation from one viewing position (for example, side-on) may be different from an appearance of the annotation from another viewing position (for example, end-on).

In further embodiments, the processor 32 displays the annotation so that it appears to be related to the surface of interest (for example, the side of the table), but so that it appears to change shape and/or position in three dimensions as the user moves. For example, if the annotation comprises a square around a small object of interest, the square may always look square to the user no matter which angle it is viewed from.

In some embodiments, the annotation always maintains the same visual shape regardless of viewing angle. In some embodiments, a scale of the visual shape is changed based on viewing distance. A centre of the shape may be determined by taking an average of all points or by using an initial drawing location. The annotation may then always be displayed as if it is facing the user, but pinned to the centre point. In one embodiment, a circle is drawn around an object. The circle still appears as a circle from all viewing locations.

A virtual laser pointer, or any other virtual annotation tool, may be used to draw onto geometry for annotation purposes. In some systems, by default, the drawing will take place on the first geometry to be hit on the laser pointer's line of sight. This may made it hard to annotate small objects, or to draw around an object. In such cases, the annotation may look correct from the perspective of the person annotating, but not from other locations in the 3D world.

The plane-projection technique of FIG. 13 may detect when the laser pointer has jumped onto more distant geometry, and instead continue to annotate on a plane aligned with the previous geometry.

FIG. 14 shows a line being drawn onto the side of a table. By default, as that line moves right off of the table, it would appear on the floor behind. Instead, by using the method of FIG. 13, the line is drawn onto the same plane as that of the side of the table, but extended beyond the table itself.

In the example described above, the beam of the laser pointer jumps from the side of the table 126 to the floor 129. The system detects a significant distance change in a short space of time, and hence determines that the surface has changed, and it that it should instead draw on an imaginary plane (instead of jumping to the floor 129).

Although in the example above the side of the table 126 is planar, in some embodiments the surface of interest may not be flat. The user may draw around corners or on a curved object. The user may draw on any surface that is continuous or near-continuous, whether or not it is flat. In such embodiments, the processor 32 determines a transition if the laser beam jumps by a significant distance, for example a distance above a threshold value. If the laser beam has jumped by a distance below the threshold value, the processor 32 continues to draw on the surface on which the laser beam lands, and does not draw on an imaginary plane or other imaginary surface. For example, in FIG. 14, if the user were to draw upwards instead of to the right, the line may bend onto the top of the table.

In some embodiments, the imaginary surface may be a best fit to a surface of interest. The imaginary surface may or may not be aligned with the surface of interest. For example, when annotating a sphere there may be no one plane aligned to that sphere. The processor 32 may choose a plane aligned to the normal of the sphere at an initial, final, or average point of annotation.

In some embodiments, once the system has started drawing on an imaginary plane, it then detects if the actual surface being hit by the laser coincides, or nearly coincides, with the imaginary plane. If the actual surface being hit by the laser coincides, or nearly coincides, with the plane, the processor 32 draws the annotation such that it starts respecting the surface again and stops being limited to the imaginary plane. This may allow the user to drawn on a curved surface, then jump to a plane, and then return to the original curved surface.

In the present embodiment, the method of FIG. 13 is applied automatically when annotating. The decision to draw on an imaginary surface is automated based on a distance jump threshold. The processor 32 assumes that if a user draws a line that starts on one surface and continues onto another surface at a distance greater than a threshold distance, the user intended for the line to continue in the plane of the first surface. However, in other embodiments, the user may turn on and off the method of FIG. 13. A toggleable menu setting may be used. The user may provide a direct user input such as holding down an additional button while annotating. For example, the user may press a button while annotating if the user wants the annotation to continue in the plane of the first surface annotated. Any suitable control may be used to turn the annotation method of FIG. 13 on or off.

In the present embodiment, virtual light is projected onto the scene using a virtual laser projector. In other embodiments, any suitable virtual annotation tool may be used to project any virtual substance. For example, a virtual pencil, virtual pen or virtual spray can may be used to project virtual ink. The virtual substance may be projected from a distance, or may be projected from a position close to the surface of interest.

In other embodiments, the method of FIG. 13 may be used for any suitable application. For example, the method of FIG. 13 may be used in a design application, or in an educational or training application in which a user is being trained to perform a manual action. The method of FIG. 13 may be used in a drawing or painting art application.

FIG. 16 is a flow chart illustrating in overview a method of an embodiment. The method of FIG. 16 may provide a combination of real-world physical movement and teleport, to allow actions such as walking down steps and looking over ledges.

At stage 130, the processor 32 generates a computer-generated scene representative of at least part of a house. In other embodiments, the computer-generated scene may be representative of any appropriate structure.

The processor 32 displays the scene as viewed from a first viewing position. The processor 32 displays the scene as if viewed from a viewpoint defined with respect to a virtual head. For example, the processor 32 may display the scene as if viewed from an appropriate height above the ground to represent the height of a user, which may be the height of a particular user who is viewing the scene.

At stage 132, the user provides a movement command to the processor 32 by making a real-world physical movement. In the present embodiment, the user walks and a change in position of the user's head is recorded. The movement command is indicative of a movement from the first viewing position to a second viewing position. Each of the first and second viewing position may be a position of the virtual head of the user. Alternatively, each of the first and second viewing positions may be defined as a position on a plan of the house, without an associated height, or may be defined in any suitable way.

In other embodiments, the movement command may be provided by any appropriate physical movement of the user. For example, the user may move their head, hand, foot, torso or other body part, and the virtual reality system 10 may translate the movement of the user into a movement command. For example, the user may step forward, and the virtual reality system 10 may translate the user's step into a movement command to move forward. In some embodiments, the movement command may be provided by tracking of the user's physical body. For example, the user may wear a body suit. Tracking devices may be attached to feet, knees or other body parts. The movement command may be provided by way of a camera and software capable of identifying body features.

In other embodiments, any suitable method of inputting a movement command may be used. The user may provide a movement command using an input device, for example a handheld input device. The movement command may be representation of a continuous movement, or of a discontinuous movement (for example, a teleport).

At stage 136, the processor 32 determines a movement of a virtual body that corresponds to the real-world physical movement of the user. In the present embodiment, the virtual body is considered to be placed vertically beneath a virtual head. The virtual body may be considered to be dragged by the virtual head, in that the movements of the virtual body are dependent on the movements of the virtual head. The virtual body does not make movements independently of the virtual head.

In the present embodiment, the virtual body is represented by a capsule, which is a cylinder capped with two hemispheres. The virtual body may be considered to be a simple non-articulated body. Although in the present embodiment the virtual body is placed directly beneath the head, in other embodiments the virtual body may be placed beneath and average of the virtual head and one or two virtual hands. In further embodiments, any representation of the virtual body may be used. For example, a more complex articulated body may be used. The more complex articulated body may in some circumstances allow for more accurate constraints and behaviours than a simpler non-articulated body.

The virtual body may be coupled to the virtual head to maintain a relative position and orientation of the virtual body and virtual head, or the virtual body may be coupled so that it is moveable (for example, rotatable) relative to the virtual head. In some embodiments, a part of the virtual body may be moveable relative to another part of the virtual body, for example to simulate bending at the waist.

The processor 32 determines the movement of the virtual body by simulating the determined movement of the virtual head and considering the virtual body to be attached to, and hanging below, the virtual head. The processor 32 may simulate an effect of gravity on the virtual body and/or simulate an interaction of the virtual body with objects in the computer-generated scene.

In the present embodiment, if the virtual head moves horizontally in a direction in which a floor level changes vertically, the processor 32 simulates gravity acting on the virtual body, causing the virtual body to move downwards if the floor level becomes lower. In the present embodiment, if a downwards floor level change is small, the virtual body acts as if stepping downwards. If a downwards floor level change is larger, the virtual body acts as if falling.

In some embodiments, the virtual head moves in a direction in which a floor level changes upwards. If the upwards floor level change is small, the virtual body acts as if stepping upwards. If the upwards floor level change is large, the virtual body is blocked by the upwards floor level change. The virtual body may be deflected or stopped.

In some circumstances, the virtual head moves horizontally in a route that would be navigable by the virtual head alone, but is not navigable by the virtual body because an object is present at a level of at least part of the virtual body. The processor 32 simulates the interaction of the virtual body with the object.

For example, the virtual head movement may comprise movement through a room in which a table is placed. The table may not block passage of the virtual head alone, but may block passage of the virtual body coupled to the virtual head.

At stage 138, the processor 32 adjusts the movement of the virtual head that was determined at stage 134 so as to take into account the movement of the virtual body that was determined at stage 136. For example, if the virtual body could not complete a movement from the first viewing position to the second viewing position, the movement of the virtual head may be curtailed so that it also does not move as far as the second viewing position.

The processor 32 determines an adjusted second viewing position, which may be different from the second viewing position requested by the user using the movement command. The second viewing position is an end point of the adjusted movement of the virtual head.

At stage 140, the processor 32 displays the computer-generated scene as viewed from the adjusted second viewing position.

In some embodiments, the processor 32 gives the appearance of teleporting by moving the virtual head from the first viewing position to the adjusted second viewing position without showing any intermediate positions. However, the position to which the virtual head is teleported may be affected by the determined movements of the virtual head and virtual body.

In other embodiments, the processor 32 displays the computer-generated scene such that the user appears to move through the computer-generated scene from the first viewing position to the adjusted second viewing position, with the user's viewing position moving in accordance with the adjusted movement of the virtual head.

In some embodiments, the user provides a succession of movement commands (for example, a succession of steps) and the processor 32 performs the process of FIG. 16 for each of the succession of movement commands.

In some embodiments, a position of the virtual body, or of part of the virtual body is only determined by a position of the head and not by an orientation of the head. For example, if the user provides a command to rotate their head, a direction from which the scene is viewed may be changed, but there may be no change in a position of the virtual body.

The method described above with reference to FIG. 16 simulates a physical body being dragged towards the position of the user's head, and then obeying physical rules such as falling under gravity. In further embodiments, any suitable physical rules may be simulated. In some circumstances, for example if the method of FIG. 16 is used in a game, the simulated virtual body may give or receive damage. For example, the virtual body may be damaged if it walks through a fire. A more complex virtual body may simulate feet, and may result in audible and/or visible footsteps. Any method may be used in which the virtual body is simulated based on the user's physical body movement.

In some embodiments, the movement of the virtual body is determined by a method other than dragging the virtual body in dependence on a movement of the virtual head. The movement of the virtual body may be in dependence on a movement of any appropriate body part of the user. The movement of the virtual body is adjusted in dependence on gravity and/or interaction with one or more objects in the scene.

FIGS. 17 to 19 show an example of the method of FIG. 16 in which a user stands on a table and moves forward. The simulated body is detected as having moved off the table and hence the user falls to the floor. FIG. 17 is an illustration of a screen shot of a computer-generated scene. FIG. 17 shows a first position 130 on top of a table 134. The first position may be a projection of a first viewing position (first virtual head position) onto the table top. A direction of view is represented by arrow 132. FIG. 17 also shows an adjusted second position 136 (which may be a projection of an adjusted second viewing position) and a direction of fall shown by arrow 138.

FIG. 18 shows a screen shot of the computer-generated scene as if viewed by a user standing on table 134 at first viewing position 130. The user is facing in the direction shown by arrow 132 and is facing downwards.

The user inputs a movement command requesting to move forward to a second viewing position. The processor 32 determines a forward movement of the virtual head. The processor 32 then determines a corresponding movement of the virtual body. When the virtual body moves forward in accordance with the movement of the virtual head, gravity acts on the virtual body and it falls downwards in the direction indicated by arrow 138. The requested movement of the virtual head is adjusted to take into account the falling of the virtual body. FIG. 19 shows a screen shot of the computer-generated scene viewed after the fall from the adjusted second viewing position 136.

FIGS. 20 to 22 show a user standing by a balcony and leaning forwards. The user provides a movement command indicative of leaning forwards. In the present embodiment, the user leans forwards in real life, and the processor 32 translates the user's leaning movement into a movement command which moves the virtual head from a first viewing position to a second viewing position.

The processor 32 determines a movement of the virtual body in dependence on the movement of the virtual head. The virtual body is detected as having collided with the balcony. The movement of the virtual body is constrained by the balcony, and the movement of the virtual head is adjusted based on the constraint to the virtual body. Hence the user does not appear to fall in the virtual world, and can look over the edge of the balcony.

FIG. 20 is a screen shot shows a general view of a computer-generated scene including the balcony, which has a balcony railing 140. A first viewing position is indicated in FIG. 20 by a circle 142, and a direction of viewing is indicated by arrow 144. FIG. 21 is a screen shot showing the computer-generated scene as viewed from the first viewing position, with the virtual head at an appropriate distance above the surface of the balcony. FIG. 22 is a screen shot in which the user has provided a movement command indicative of leaning over the balcony. The balcony rail 140 constrains the virtual body, allowing a view of leaning over the balcony without falling.

In the embodiments described above with reference to FIGS. 16 to 22, an entire virtual body is simulated. The virtual body is simulated as a capsule. The capsule comprises a cylinder capped with two hemispheres. In alternative embodiments, one or more parts of a virtual body may be simulated. For example, a torso, leg or arm may be simulated. In some embodiments, the virtual body has a shape resembling that of a human body. In other embodiments, the virtual body may have a simplified shape, for example a simple geometric shape such as a cylinder or cuboid. The virtual body may comprise a plurality of virtual body parts. The virtual body parts may be moveable relative to each other.

In some virtual reality simulations, for example virtual reality games, a user's head and/or hands are tracked with no physical simulation of a body of the user. In such virtual reality simulations, moving in the physical world such that the user is suspended in mid-air in the virtual world may not cause the user to fall in the virtual world.

In some virtual reality simulations, for example virtual reality games, the user may directly control a simulated body by controller inputs. For example, the user may instruct the virtual body to move forward or backward, or to rotate. In such virtual reality simulations, physical head movements may be ignored or may not contribute to a position of the simulated body.

By providing a method in which a virtual body is moved in dependence on a movement of a virtual head, a physical interaction of a body with its surroundings may be simulated. Physical movements of the head may contribute to what is seen by the user. However, unrealistic movements of the head (for example, movements that cause the user to appear to be suspended in mid-air) may be avoided.

In other embodiments, the method of FIG. 16 may be used for any suitable virtual reality application, for example in gaming. The method of FIG. 16 may be used for virtual maps or virtual tourism.

FIG. 23 is a flow chart illustrating in overview a method of an embodiment in which a user may interact with virtual objects, for example light switches or door handles, at a distance, rather than needing to be in close proximity with the virtual object in the virtual world.

At stage 150 of FIG. 23, the processor 32 displays a computer-generated scene. In the present embodiment, the computer-generated scene is representative of a room in a house. In other embodiments, the computer-generated scene may be representative of any suitable structure. The computer-generated scene comprises one or more interactive virtual objects.

FIG. 24 shows a computer-generated scene comprising two interactive virtual objects. The two interactive virtual objects are light switch 160 and slider 162. The computer-generated scene is viewed from a viewing position such that the light switch 160 and slider 162 appear to be at a distance from the user.

In other embodiments, the interactive virtual object may be representative of any real-world object that is capable of being manipulated by the user. For example, the interactive virtual object may be representative of a real object that is configured to control lighting, sound, heat, air conditioning or another environmental control. The interactive virtual object may be representative of a switch, button, knob, slider or any other suitable control.

In further embodiments, the interactive virtual object may not correspond to a real-life control. In some embodiments, an interactive virtual object may be used to control a parameter that is not changeable in real life, for example, as a wall position, window position or floor level. In some embodiments, the interactive virtual object is an item, for example an item of furniture, that is configured such that it may be moved by a user to a different position within the scene.

FIG. 24 also shows a virtual handheld input device 164 representative of a real-life handheld input device 40 that is held by the user. In the description below, the user is described as operating the handheld input device 164. Such operating results from a corresponding operation of the real-life handheld input device 40. In other embodiments, a different real-life input device may be used to operate the handheld input device 164. In further embodiments, a different input device may be represented in the scene.

The handheld input device 40 may also be referred to as a controller. A controller position and direction may be seen in FIG. 24 as the position and pointing direction of virtual handheld input device 164.

At stage 152, the user points at an interactive object using the handheld input device 40 to select the interactive object. A cursor may be displayed to indicate a position at which the handheld input device 40 is pointing. FIG. 25 shows the virtual handheld input device 164 pointed towards the light switch 160.

At stage 154, the processor 32 displays a virtual manipulation indicator overlaid with or adjacent to the virtual interactive object that has been selected by the user. The virtual manipulation indicator indicates that the virtual interactive object is in an active mode.

In FIG. 25, the virtual manipulation indicator displayed by processor 32 is a virtual hand 166 which is partially overlaid with the light switch 160. The virtual hand 166 is displayed as if poised to operate the switch. A finger of the virtual hand 166 points to a toggle of the switch. In the present embodiment, the virtual hand 166 is blue and semi-transparent. The interactive virtual object that is currently being interacted with is indicated by the blue semi-transparent hand. The virtual hand 166 appears not to be connected to a body. For example, the virtual hand 166 does not appear to be connected to a body of the user.

In other embodiments, any virtual manipulation indicator may be used. For example, the virtual manipulation indicator may comprise a region of colour superimposed on the interactive virtual object, a shape superimposed on or surrounding the interactive virtual object, or an arrow pointing at the interactive virtual object.

At stage 156, the user operates the handheld input device 164 to manipulate the virtual interactive object. The operating of the handheld input device 164 provides a manipulation command to the processor 32, which causes the processor 32 to manipulate the virtual interactive object. In the present embodiment, the user provides the manipulation command by pressing a button on the real-life handheld input device. The processor 32 adjusts the computer-generated scene to simulate the effect of the light switch 160 switching, for example by turning on or off a light. In other embodiments, any method of providing the manipulation command may be used.

In response to the manipulation command, the processor 32 causes the virtual hand 166 to move and the light switch 160 to switch.

By allowing operation of an interactive virtual object that is representative of a real object (for example, a light switch) the user may understand which controls would be available in a structure represented in the computer-generated scene, and what those controls do.

Stages 152 to 156 may be repeated for other virtual interactive objects in the computer-generated scene.

For example, in FIG. 26, the user has pointed the handheld input device 164 at the slider 162. In response to the pointing of the handheld input device 164 at the slider 162, the processor 32 displays the virtual hand 166 such that it is partially overlaid on the slider 162.

The virtual hand 166 indicates which one of the virtual interactive objects is in an active mode. In the embodiment shown in FIGS. 24 to 26, the processor 32 puts the light switch 160 into an active mode in response to the user pointing at light switch 160. Then when the user points at slider 162, the processor 32 puts the light switch 160 into a passive mode and puts the slider 162 into an active mode. When a virtual interactive object is in active mode, it may be controlled by sending a manipulation command via the handheld input device 164.

In other embodiments, any suitable virtual interactive objects may be present in the scene, for example a virtual lighting control, a virtual door control, a virtual window control or a virtual heating control. A virtual interactive object may be representative of a real object that is configured to control a door, a window, a window covering or any other moveable item in the house (or in any suitable structure). Operation of each control may be simulated in response to a manipulation command. Operation of virtual lighting control may cause a change in the lighting of the computer-generated scene, for example a change in lighting intensity, colour, or direction. Operation of a virtual door control may allow a door to be opened or closed. Operation of a virtual window control may allow a window to be opened or closed, or may allow another change in the window, for example a change in tint. Operation of a heating control may cause, for example, a fire to be turned on or off.

In some embodiments, a virtual interactive object is representative of an item of furniture. When the virtual interactive object is in active mode, the virtual interactive object may be moved by sending a manipulation command via the handheld input device 164. This may allow the user to pick up and move furniture, which may create a simple virtual interior design feature.

The virtual hand 166 (or, in other embodiments, a different virtual manipulation indicator) may mimic a physical controller's movements. For example, the virtual hand may move around the scene in accordance with a movement of the handheld input device 164.

In the present embodiment, a virtual interactive object is selected by pointing at it using the handheld input device 164. In other embodiments, any suitable method may be used to select the virtual interactive object. For example, any suitable input device may be used. The virtual interactive object may be selected using a body movement of the user, for example a gesture of the user.

In the present embodiment, the manipulation command is provided by pressing a button on the handheld input device. In other embodiments, any method of providing the manipulation command may be used. In some embodiments, an action used to provide the manipulation command is similar to an action that would be used to operate a real-life version of the virtual interactive object (for example, switching a switch or sliding a slider). An action of the virtual manipulation indicator may mimic an action made by the user to produce the manipulation command and/or an action that would be used to operate a real-life version of the virtual interactive object.

The method of FIG. 23 may combine proximity with direction to detect when an object is being pointed at. A virtual hand 166 is displayed interacting closely with the virtual object, allowing the user to manipulate objects from a distance.

Some virtual reality applications may allow interaction with virtual objects using position-tracked controllers. Such virtual reality applications may require the controller to make close virtual contact with the virtual object before it can be manipulated.

By instead providing an interaction at a distance, the method of FIG. 23 may provide a more convenient way for a user to operate virtual objects in the computer-generated scene. For example, user may operate several different objects in different parts of a room from a single viewing position. In some embodiments, the user may operate interactive virtual objects that are more than 1 metre, 5 metres or 10 metres away in the virtual world.

By displaying a virtual manipulation indicator (for example, a virtual hand), the user may know which object is currently active and therefore capable of being manipulated by sending a manipulation command.

In other embodiments, the method of FIG. 23 may be used in any suitable virtual reality application. The method of FIG. 23 may be used in many video game VR contexts.

In embodiments described above, the methods of FIGS. 2, 5, 9, 13, 16 and 23 are used to display an architectural structure to a user, for example to display a proposed buildings or proposed modifications to an architectural client, architect, planner, surveyor or builder. In further embodiments, the method of FIG. 2, 5, 9, 13, 16 or 23 may be used to view any suitable type of building. The building may be a residential building, for example a house or apartment building. The building may be a commercial building, for example an office building, hotel, conference centre, or retail centre. The methods of FIG. 2, 5, 9, 13, 16 or 23 may be used to view a streetscape or natural setting. The methods of FIG. 2, 5, 9, 13, 16 or 23 may be used for any suitable application, for example in games, education or training, or historical reconstruction.

In the embodiments described above, particular input methods have been described, for example providing a command via a handheld input device such as a games controller or wand. In other embodiments, any suitable method of input may be user. For example, a user may input a command via any suitable input device, for example a keyboard, mouse, joystick or trackball. Input may be provided by a user moving any part of their body, for example their head, hand, foot or torso. Input may be provided by touch or voice commands.

Features of the method of any one of FIG. 2, 5, 9, 13, 16 or 23 may be combined with features of the method of any other one or more of FIG. 2, 5, 9, 13, 16 or 23.

It will be understood that the present invention has been described above purely by way of example, and that modifications of detail can be made within the scope of the invention.

Each feature disclosed in the description and (where appropriate) the claims and drawings may be provided independently or in any appropriate combination.

The invention claimed is:
1. A method comprising:
displaying in virtual reality a three-dimensional computer-generated scene representative of a structure as if viewed from a first viewing position of a virtual head coupled to a virtual body, wherein the first viewing position corresponds to a first coordinate position inside the three dimensional computer-generated scene;
obtaining a movement command from a real-world physical movement of a user, the movement command indicative of a movement of the virtual head from the first viewing position to a second viewing position,
wherein the second viewing position corresponds to a second coordinate position inside the three dimensional computer-generated scene and
wherein the movement of the virtual head to the second viewing position corresponds to a movement through the structure that would not be possible in real life;
determining a movement of the virtual body corresponding to the movement of the virtual head and in dependence on an effect of gravity on the virtual body in the three-dimensional computer-generated scene and/or in dependence on the presence of at least one object within the three-dimensional computer-generated scene that inhibits the movement of the virtual body;
adjusting the movement of the virtual head in dependence on the corresponding determined movement of the virtual body such that the adjusted movement is from the first viewing position to an adjusted second viewing position, wherein the adjusted second viewing position corresponds to a second adjusted coordinate position inside the three-dimensional computer generated scene, and the adjusted movement corresponds to a movement through the structure that would be possible in real life,
wherein the adjusting of the movement is such that the adjusted movement of the virtual head does not correspond with the real-world physical movement of the user, and
displaying in virtual reality a three-dimensional computer-generated scene of the structure as if viewed from the adjusted second viewing position.
2. The method according to claim 1, wherein the first viewing position is at a greater height in the three-dimensional computer-generated scene than the second viewing position, and the adjusting of the movement of the virtual head comprises adjusting the movement of the virtual head to represent falling under gravity.
3. The method according to claim 1, wherein the adjusting of the movement of the virtual head comprises adjusting the movement of the virtual head to represent a constraint on the virtual body due to the presence of the at least one object, the constraint preventing movement of the virtual head to the second viewing position.

4. The method according to claim 1, wherein the movement of the virtual body is in dependence on a movement of a virtual head and/or a movement of at least one virtual hand.

5. The method according to claim 1, wherein the real-world physical movement of the user comprises a movement of the user's head.

6. The method according to claim 1, wherein the obtaining of the real-world physical movement is via a user input device, the user input device comprising at least one of a body suit, a tracking device, a camera, body recognition software.

7. The method according to claim 1, wherein adjusting the movement of the virtual head in dependence on the movement of the virtual body comprises at least one of reducing the movement of the virtual head, changing a trajectory of the virtual head, changing an angle of the virtual head.

8. The method according to claim 1, comprising preventing the virtual head from moving into a position that is impossible in real life.

9. The method according to claim 1, comprising preventing the virtual head from moving by an object that interacts with the virtual body but does not interact directly with the virtual head.

10. A non-transitory computer program product comprising computer readable instructions that are executable by a processor to perform the method according to claim 1.

11. An apparatus comprising at least one display screen, at least one user input device and at least one processor configured to:
   display in virtual reality on the at least one display screen a three-dimensional computer-generated scene as if viewed from a first viewing position of a virtual head coupled to a virtual body, wherein the first viewing position corresponds to a first coordinate position inside the three dimensional computer-generated scene;
   obtain a movement command from a real-world physical movement of a user, the movement command indicative of a movement of the virtual head from the first viewing position to a second viewing position, wherein the second viewing position corresponds to a second coordinate position inside the three dimensional computer-generated scene and
   wherein the movement of the virtual head to the second viewing position corresponds to a movement through the structure that would not be possible in real life;
   determine a movement of the virtual body corresponding to the movement of the virtual head and in dependence on an effect of gravity on the virtual body in the three-dimensional computer-generated scene and/or in dependence on the presence of at least one object within the three-dimensional computer-generated scene that inhibits the movement of the virtual body; and
   adjust the movement of the virtual head in dependence on the corresponding determined movement of the virtual body such that the adjusted movement is from the first viewing position to an adjusted second viewing position, wherein the adjusted second viewing position corresponds to a second adjusted coordinate position inside the three-dimensional computer generated scene and the adjusted movement corresponds to a movement through the structure that would be possible in real life,
   wherein the adjusting of the movement is such that the adjusted movement of the virtual head does not correspond with the real-world physical movement of the user, and
   display in virtual reality on the at least one display screen a three-dimensional computer-generated scene of the structure as if viewed from the adjusted second viewing position.

* * * * *